(12) United States Patent
Balle et al.

(10) Patent No.: US 12,288,101 B2
(45) Date of Patent: *Apr. 29, 2025

(54) TECHNOLOGIES FOR DIVIDING WORK ACROSS ACCELERATOR DEVICES

(71) Applicant: Intel Corporation, Santa Clara, CA (US)

(72) Inventors: Susanne M. Balle, Hudson, NH (US); Francesc Guim Bernat, Barcelona (ES); Slawomir Putyrski, Gdynia (PL); Joe Grecco, Saddle Brook, NJ (US); Henry Mitchel, Wayne, NJ (US); Evan Custodio, North Attleboro, MA (US); Rahul Khanna, Portland, OR (US); Sujoy Sen, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,679

(22) Filed: Jan. 5, 2024

(65) Prior Publication Data

US 2024/0143410 A1 May 2, 2024

Related U.S. Application Data

(63) Continuation of application No. 17/681,025, filed on Feb. 25, 2022, now Pat. No. 11,907,557, which is a (Continued)

(30) Foreign Application Priority Data

Aug. 30, 2017 (IN) .............................. 201741030632

(51) Int. Cl.
*G06F 15/80* (2006.01)
*G06F 3/06* (2006.01)
(Continued)

(52) U.S. Cl.
CPC ............ *G06F 9/505* (2013.01); *G06F 3/0604* (2013.01); *G06F 3/0608* (2013.01);
(Continued)

(58) Field of Classification Search
CPC ............. G06F 11/0709; G06F 11/3055; G06F 13/1652; G06F 15/80; G06F 3/0617;
(Continued)

(56) References Cited

U.S. PATENT DOCUMENTS 6,085,295 A 7/2000 Ekanadham et al.
6,104,696 A 8/2000 Kadambi et al.
(Continued)

FOREIGN PATENT DOCUMENTS

CN 1468007 1/2004
CN 1752887 3/2006
(Continued)

OTHER PUBLICATIONS

Applicant Response to Notice of Improper Request for Corrected Filing Receipt for U.S. Appl. No. 18/103,739, dated Feb. 24, 2023.
(Continued)

*Primary Examiner* — Hau H Nguyen
(74) *Attorney, Agent, or Firm* — Essential Patents Group, LLP; Christopher K. Gagne

(57) ABSTRACT

Technologies for dividing work across one or more accelerator devices include a compute device. The compute device is to determine a configuration of each of multiple accelerator devices of the compute device, receive a job to be accelerated from a requester device remote from the compute device, and divide the job into multiple tasks for a parallelization of the multiple tasks among the one or more accelerator devices, as a function of a job analysis of the job and the configuration of each accelerator device. The compute engine is further to schedule the tasks to the one or more
(Continued)

Data Center 1100 accelerator devices based on the job analysis and execute the tasks on the one or more accelerator devices for the parallelization of the multiple tasks to obtain an output of the job.

20 Claims, 17 Drawing Sheets

Related U.S. Application Data continuation of application No. 17/321,186, filed on May 14, 2021, now Pat. No. 11,429,297, which is a continuation of application No. 15/721,829, filed on Sep. 30, 2017, now Pat. No. 11,029,870.

(60) Provisional application No. 62/427,268, filed on Nov. 29, 2016.

(51) Int. Cl.

| | |
|---|---|
| G06F 7/06 | (2006.01) |
| G06F 8/65 | (2018.01) |
| G06F 8/654 | (2018.01) |
| G06F 8/656 | (2018.01) |
| G06F 8/658 | (2018.01) |
| G06F 9/38 | (2018.01) |
| G06F 9/4401 | (2018.01) |
| G06F 9/455 | (2018.01) |
| G06F 9/48 | (2006.01) |
| G06F 9/50 | (2006.01) |
| G06F 9/54 | (2006.01) |
| G06F 11/07 | (2006.01) |
| G06F 11/30 | (2006.01) |
| G06F 11/34 | (2006.01) |
| G06F 12/02 | (2006.01) |
| G06F 12/06 | (2006.01) |
| G06F 13/16 | (2006.01) |
| G06F 16/174 | (2019.01) |
| G06F 21/57 | (2013.01) |
| G06F 21/62 | (2013.01) |
| G06F 21/73 | (2013.01) |
| G06F 21/76 | (2013.01) |
| G06T 1/20 | (2006.01) |
| G06T 1/60 | (2006.01) |
| G06T 9/00 | (2006.01) |
| H01R 13/453 | (2006.01) |
| H01R 13/631 | (2006.01) |
| H03K 19/173 | (2006.01) |
| H03M 7/30 | (2006.01) |
| H03M 7/40 | (2006.01) |
| H03M 7/42 | (2006.01) |
| H04L 9/08 | (2006.01) |
| H04L 12/28 | (2006.01) |
| H04L 12/46 | (2006.01) |
| H04L 41/044 | (2022.01) |
| H04L 41/0816 | (2022.01) |
| H04L 41/0853 | (2022.01) |
| H04L 41/12 | (2022.01) |
| H04L 43/04 | (2022.01) |
| H04L 43/06 | (2022.01) |
| H04L 43/08 | (2022.01) |
| H04L 43/0894 | (2022.01) |
| H04L 47/20 | (2022.01) |
| H04L 47/2441 | (2022.01) |
| H04L 49/104 | (2022.01) |
| H04L 61/5007 | (2022.01) |
| H04L 67/10 | (2022.01) |
| H04L 67/1014 | (2022.01) |
| H04L 67/63 | (2022.01) |
| H04L 67/75 | (2022.01) |
| H05K 7/14 | (2006.01) |
| G06F 11/14 | (2006.01) |
| G06F 16/28 | (2019.01) |
| H04L 9/40 | (2022.01) |
| H04L 41/046 | (2022.01) |
| H04L 41/0896 | (2022.01) |
| H04L 41/142 | (2022.01) |
| H04L 47/78 | (2022.01) |
| H04Q 11/00 | (2006.01) |

(52) U.S. Cl.
CPC .......... *G06F 3/0611* (2013.01); *G06F 3/0613* (2013.01); *G06F 3/0617* (2013.01); *G06F 3/0641* (2013.01); *G06F 3/0647* (2013.01); *G06F 3/065* (2013.01); *G06F 3/0653* (2013.01); *G06F 3/067* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3891* (2013.01); *G06F 9/4401* (2013.01); *G06F 9/45533* (2013.01); *G06F 9/4843* (2013.01); *G06F 9/4881* (2013.01); *G06F 9/5005* (2013.01); *G06F 9/5038* (2013.01); *G06F 9/5044* (2013.01); *G06F 9/5083* (2013.01); *G06F 9/544* (2013.01); *G06F 11/0709* (2013.01); *G06F 11/0751* (2013.01); *G06F 11/079* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/453* (2013.01); *H01R 13/4536* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/5007* (2022.05); *H04L 67/10* (2013.01); *H04L 67/1014* (2013.01); *H04L 67/63* (2022.05); *H04L 67/75* (2022.05); *H05K 7/1452* (2013.01); *H05K 7/1487* (2013.01); *H05K 7/1491* (2013.01); *G06F 11/1453* (2013.01); *G06F 12/023* (2013.01); *G06F 15/80* (2013.01); *G06F 16/285* (2019.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425*

(2013.01); *H04Q 11/0005* (2013.01); *H05K 7/1447* (2013.01); *H05K 7/1492* (2013.01)

(58) Field of Classification Search
CPC ...... G06F 3/067; G06F 9/3851; G06F 9/3891; G06F 9/4843; G06T 1/20
See application file for complete search history.

(56) References Cited

U.S. PATENT DOCUMENTS

| | | |
|---|---|---|
| 6,115,372 A | 9/2000 | Dinha |
| 6,353,885 B1 | 3/2002 | Herzi et al. |
| 6,367,018 B1 | 4/2002 | Jain |
| 6,650,620 B1 | 11/2003 | Neogi |
| 6,714,549 B1 | 3/2004 | Phaltankar |
| 7,415,022 B2 | 8/2008 | Kadambi et al. |
| 7,739,677 B1 | 6/2010 | Kekre et al. |
| 7,835,388 B2 | 11/2010 | Hu |
| 7,962,736 B1 | 6/2011 | Polyudov |
| 8,248,928 B1 | 8/2012 | Wang et al. |
| 8,566,574 B2 | 10/2013 | Shriver |
| 8,788,663 B1 | 7/2014 | Adogla et al. |
| 8,812,765 B2 | 8/2014 | Dai et al. |
| 8,826,277 B2 | 9/2014 | Chang et al. |
| 9,026,765 B1 | 5/2015 | Marshak et al. |
| 9,042,402 B1 | 5/2015 | Loganathan et al. |
| 9,143,406 B2 | 9/2015 | Waggener et al. |
| 9,253,055 B2 | 2/2016 | Nelke et al. |
| 9,356,883 B1 | 5/2016 | Borthakur |
| 9,612,767 B2 | 4/2017 | Huang et al. |
| 9,733,980 B1 | 8/2017 | Khan et al. |
| 9,859,918 B1 | 1/2018 | Gopal |
| 9,893,988 B2 | 2/2018 | Agarwal et al. |
| 9,929,747 B2 | 3/2018 | Gopal |
| 9,936,613 B2 | 4/2018 | Adiletta |
| 9,954,552 B2 | 4/2018 | Gopal |
| 9,973,207 B2 | 5/2018 | Gopal |
| 10,033,404 B2 | 7/2018 | Cutter |
| 10,034,407 B2 | 7/2018 | Miller |
| 10,045,098 B2 | 8/2018 | Adiletta |
| 10,070,207 B2 | 9/2018 | Adiletta et al. |
| 10,085,358 B2 | 9/2018 | Adiletta |
| 10,091,904 B2 | 10/2018 | Miller |
| 10,116,327 B2 | 10/2018 | Cutter |
| 10,154,023 B1 | 12/2018 | Nossik et al. |
| 10,191,684 B2 | 1/2019 | Gopal et al. |
| 10,234,833 B2 | 3/2019 | Ahuja |
| 10,263,637 B2 | 4/2019 | Gopal |
| 10,268,412 B2 | 4/2019 | Guilford |
| 10,313,769 B2 | 6/2019 | Miller |
| 10,334,334 B2 | 6/2019 | Miller |
| 10,339,317 B2 | 7/2019 | Raghuram et al. |
| 10,348,327 B2 | 7/2019 | Adiletta |
| 10,349,152 B2 | 7/2019 | Adiletta |
| 10,356,495 B2 | 7/2019 | Adiletta |
| 10,368,148 B2 | 7/2019 | Kumar |
| 10,390,114 B2 | 8/2019 | Schmisseur |
| 10,397,670 B2 | 8/2019 | Gorius |
| 10,411,729 B2 | 9/2019 | Miller |
| 10,448,126 B2 | 10/2019 | Gilsdorf |
| 10,461,774 B2 | 10/2019 | Balle |
| 10,469,252 B2 | 11/2019 | Schmisseur |
| 10,474,460 B2 | 11/2019 | Adiletta |
| 10,476,670 B2 | 11/2019 | Schmisseur |
| 10,489,156 B2 | 11/2019 | Munoz |
| 10,542,333 B2 | 1/2020 | Miller |
| 10,963,176 B2 | 3/2021 | Balle et al. |
| 10,990,309 B2 | 4/2021 | Bernat et al. |
| 11,029,870 B2 | 6/2021 | Balle et al. |
| 11,128,553 B2 | 9/2021 | Adiletta et al. |
| 11,507,430 B2 | 11/2022 | Subramanian et al. |
| 11,630,702 B2 | 4/2023 | Kumar et al. |
| 2003/0026525 A1 | 2/2003 | Alvarez |
| 2003/0028594 A1 | 2/2003 | Laschkewitsch et al. |
| 2004/0205304 A1 | 10/2004 | McKenney et al. |
| 2005/0135231 A1 | 6/2005 | Bellovin |
| 2006/0036719 A1 | 2/2006 | Bodin et al. |
| 2006/0059492 A1 | 3/2006 | Fellenstein et al. |
| 2006/0064752 A1 | 3/2006 | Wang et al. |
| 2006/0161750 A1 | 7/2006 | Perkins et al. |
| 2006/0168337 A1 | 7/2006 | Stahl et al. |
| 2006/0184670 A1 | 8/2006 | Beeson et al. |
| 2006/0239270 A1 | 10/2006 | Yao et al. |
| 2007/0147400 A1 | 6/2007 | Hu |
| 2007/0180515 A1 | 8/2007 | Danilak |
| 2008/0075071 A1 | 3/2008 | Beshai |
| 2008/0077993 A1 | 3/2008 | Zimmer et al. |
| 2008/0229318 A1 | 9/2008 | Franke |
| 2009/0013166 A1 | 1/2009 | Crowder, Jr. et al. |
| 2009/0172377 A1 | 7/2009 | Gueron et al. |
| 2009/0198792 A1 | 8/2009 | Wittenschlaeger |
| 2009/0327741 A1 | 12/2009 | Zimmer et al. |
| 2010/0064295 A1 | 3/2010 | Aho et al. |
| 2010/0111309 A1 | 5/2010 | Khatri et al. |
| 2010/0169640 A1 | 7/2010 | Smith et al. |
| 2010/0191823 A1 | 7/2010 | Archer et al. |
| 2011/0185125 A1 | 7/2011 | Jain et al. |
| 2011/0228767 A1 | 9/2011 | Singla et al. |
| 2011/0264925 A1 | 10/2011 | Russo et al. |
| 2011/0296231 A1 | 12/2011 | Dake |
| 2011/0320804 A1 | 12/2011 | Chan et al. |
| 2011/0320823 A1 | 12/2011 | Saroiu et al. |
| 2012/0054770 A1 | 3/2012 | Krishnamurthy et al. |
| 2012/0072481 A1 | 3/2012 | Nandlall et al. |
| 2012/0099863 A1 | 4/2012 | Xu et al. |
| 2012/0207139 A1 | 8/2012 | Husted et al. |
| 2012/0230343 A1 | 9/2012 | Schrum, Jr. |
| 2012/0254602 A1 | 10/2012 | Bhansali et al. |
| 2012/0303885 A1 | 11/2012 | Jeddeloh |
| 2013/0054948 A1 | 2/2013 | Raj et al. |
| 2013/0159638 A1 | 6/2013 | Koinuma et al. |
| 2013/0179485 A1 | 7/2013 | Chapman et al. |
| 2013/0232495 A1 | 9/2013 | Rossbach et al. |
| 2013/0297769 A1 | 11/2013 | Chang et al. |
| 2013/0325998 A1 | 12/2013 | Hormuth et al. |
| 2013/0345530 A1 | 12/2013 | McRoberts et al. |
| 2014/0012961 A1 | 1/2014 | Pope |
| 2014/0013327 A1 | 1/2014 | Sherwood et al. |
| 2014/0047272 A1 | 2/2014 | Breternitz et al. |
| 2014/0047341 A1 | 2/2014 | Breternitz et al. |
| 2014/0064149 A1 | 3/2014 | Frey |
| 2014/0079221 A1 | 3/2014 | McCallum et al. |
| 2014/0089650 A1 | 3/2014 | Polzin et al. |
| 2014/0089654 A1 | 3/2014 | Lerner et al. |
| 2014/0089712 A1 | 3/2014 | Machnicki et al. |
| 2014/0095691 A1 | 4/2014 | Ganguli et al. |
| 2014/0230078 A1 | 8/2014 | Graham |
| 2014/0359044 A1 | 12/2014 | Davis et al. |
| 2015/0007182 A1 | 1/2015 | Rossbach et al. |
| 2015/0074425 A1 | 3/2015 | Griffes et al. |
| 2015/0106804 A1 | 4/2015 | Chandrashekhar et al. |
| 2015/0149640 A1 | 5/2015 | Douglas et al. |
| 2015/0195372 A1 | 7/2015 | Zheng |
| 2015/0229529 A1 | 8/2015 | Engebretsen |
| 2015/0281065 A1 | 10/2015 | Liljenstolpe |
| 2015/0333824 A1 | 11/2015 | Swinkels et al. |
| 2015/0334867 A1 | 11/2015 | Faw et al. |
| 2015/0381426 A1 | 12/2015 | Roese et al. |
| 2016/0050194 A1 | 2/2016 | Rachmiel |
| 2016/0087847 A1 | 3/2016 | Krithivas et al. |
| 2016/0088578 A1 | 3/2016 | Das et al. |
| 2016/0118121 A1 | 4/2016 | Kelly et al. |
| 2016/0127191 A1 | 5/2016 | Nair |
| 2016/0147592 A1 | 5/2016 | Guddeti |
| 2016/0162281 A1 | 6/2016 | Hokiyama |
| 2016/0164739 A1 | 6/2016 | Skalecki |
| 2016/0231939 A1 | 8/2016 | Cannata et al. |
| 2016/0234580 A1 | 8/2016 | Clarke et al. |
| 2016/0306663 A1 | 10/2016 | Chang et al. |
| 2016/0306677 A1 | 10/2016 | Hira et al. |
| 2017/0019302 A1 | 1/2017 | Lapiotis et al. |
| 2017/0046179 A1 | 2/2017 | Teh et al. |
| 2017/0070431 A1 | 3/2017 | Nidumolu et al. |
| 2017/0076195 A1 | 3/2017 | Yang et al. |
| 2017/0093756 A1 | 3/2017 | Bernat et al. |
| 2017/0109205 A1 | 4/2017 | Ahuja et al. |

(56) References Cited

U.S. PATENT DOCUMENTS

| | | |
|---|---|---|
| 2017/0116004 A1 | 4/2017 | Devegowda et al. |
| 2017/0124329 A1 | 5/2017 | Ghafoor et al. |
| 2017/0140151 A1 | 5/2017 | Nelson et al. |
| 2017/0150621 A1 | 5/2017 | Breakstone et al. |
| 2017/0177873 A1 | 6/2017 | Raghuram et al. |
| 2017/0185786 A1 | 6/2017 | Ylinen et al. |
| 2017/0199746 A1 | 7/2017 | Nguyen et al. |
| 2017/0223436 A1 | 8/2017 | Moynihan et al. |
| 2017/0251077 A1 | 8/2017 | Eerpini et al. |
| 2017/0257970 A1 | 9/2017 | Alleman et al. |
| 2017/0264493 A1 | 9/2017 | Cencini et al. |
| 2017/0279705 A1 | 9/2017 | Lin et al. |
| 2017/0315798 A1 | 11/2017 | Shivanna et al. |
| 2017/0317945 A1 | 11/2017 | Guo et al. |
| 2017/0329860 A1 | 11/2017 | Jones |
| 2018/0004835 A1 | 1/2018 | Piechowicz et al. |
| 2018/0014306 A1 | 1/2018 | Adiletta |
| 2018/0014757 A1 | 1/2018 | Kumar |
| 2018/0017700 A1 | 1/2018 | Adiletta |
| 2018/0024578 A1 | 1/2018 | Ahuja |
| 2018/0024739 A1 | 1/2018 | Schmisseur |
| 2018/0024740 A1 | 1/2018 | Miller |
| 2018/0024752 A1 | 1/2018 | Miller |
| 2018/0024756 A1 | 1/2018 | Miller |
| 2018/0024764 A1 | 1/2018 | Miller |
| 2018/0024771 A1 | 1/2018 | Miller |
| 2018/0024775 A1 | 1/2018 | Miller |
| 2018/0024776 A1 | 1/2018 | Miller |
| 2018/0024838 A1 | 1/2018 | Nachimuthu |
| 2018/0024860 A1 | 1/2018 | Balle |
| 2018/0024861 A1 | 1/2018 | Balle |
| 2018/0024864 A1 | 1/2018 | Wilde |
| 2018/0024867 A1 | 1/2018 | Gilsdorf |
| 2018/0024932 A1 | 1/2018 | Nachimuthu et al. |
| 2018/0024947 A1 | 1/2018 | Miller |
| 2018/0024957 A1 | 1/2018 | Nachimuthu |
| 2018/0024958 A1 | 1/2018 | Nachimuthu |
| 2018/0024960 A1 | 1/2018 | Wagh |
| 2018/0025299 A1 | 1/2018 | Kumar |
| 2018/0026652 A1 | 1/2018 | Cutter |
| 2018/0026653 A1 | 1/2018 | Cutter |
| 2018/0026654 A1 | 1/2018 | Gopal |
| 2018/0026655 A1 | 1/2018 | Gopal |
| 2018/0026656 A1 | 1/2018 | Gopal |
| 2018/0026800 A1 | 1/2018 | Munoz |
| 2018/0026835 A1 | 1/2018 | Nachimuthu |
| 2018/0026849 A1 | 1/2018 | Guim |
| 2018/0026851 A1 | 1/2018 | Adiletta |
| 2018/0026868 A1 | 1/2018 | Guim |
| 2018/0026882 A1 | 1/2018 | Gorius |
| 2018/0026904 A1 | 1/2018 | Van De Groenendaal |
| 2018/0026905 A1 | 1/2018 | Balle et al. |
| 2018/0026906 A1 | 1/2018 | Balle |
| 2018/0026907 A1 | 1/2018 | Miller |
| 2018/0026908 A1 | 1/2018 | Nachimuthu |
| 2018/0026910 A1 | 1/2018 | Balle et al. |
| 2018/0026912 A1 | 1/2018 | Guim |
| 2018/0026913 A1 | 1/2018 | Balle |
| 2018/0026918 A1 | 1/2018 | Kumar |
| 2018/0027055 A1 | 1/2018 | Balle et al. |
| 2018/0027057 A1 | 1/2018 | Balle |
| 2018/0027058 A1 | 1/2018 | Balle et al. |
| 2018/0027059 A1 | 1/2018 | Miller |
| 2018/0027060 A1 | 1/2018 | Metsch et al. |
| 2018/0027062 A1 | 1/2018 | Bernat |
| 2018/0027063 A1 | 1/2018 | Nachimuthu |
| 2018/0027066 A1 | 1/2018 | Van De Groenendaal et al. |
| 2018/0027067 A1 | 1/2018 | Guim |
| 2018/0027093 A1 | 1/2018 | Guim |
| 2018/0027312 A1 | 1/2018 | Adiletta |
| 2018/0027313 A1 | 1/2018 | Adiletta |
| 2018/0027376 A1 | 1/2018 | Kumar |
| 2018/0027679 A1 | 1/2018 | Schmisseur |
| 2018/0027680 A1 | 1/2018 | Kumar |
| 2018/0027682 A1 | 1/2018 | Adiletta |
| 2018/0027684 A1 | 1/2018 | Miller |
| 2018/0027685 A1 | 1/2018 | Miller |
| 2018/0027686 A1 | 1/2018 | Adiletta |
| 2018/0027687 A1 | 1/2018 | Adiletta |
| 2018/0027688 A1 | 1/2018 | Adiletta |
| 2018/0027703 A1 | 1/2018 | Adiletta |
| 2018/0266510 A1 | 1/2018 | Gopal |
| 2018/0032982 A1 | 2/2018 | Takeuchi |
| 2018/0067857 A1 | 3/2018 | Wang et al. |
| 2018/0077235 A1 | 3/2018 | Nachimuthu et al. |
| 2018/0150240 A1 | 5/2018 | Bernat et al. |
| 2018/0150256 A1 | 5/2018 | Kumar |
| 2018/0150293 A1 | 5/2018 | Nachimuthu |
| 2018/0150298 A1 | 5/2018 | Balle |
| 2018/0150299 A1 | 5/2018 | Balle |
| 2018/0150330 A1 | 5/2018 | Bernat |
| 2018/0150334 A1 | 5/2018 | Bernat et al. |
| 2018/0150343 A1 | 5/2018 | Bernat |
| 2018/0150372 A1 | 5/2018 | Nachimuthu |
| 2018/0150391 A1 | 5/2018 | Mitchel |
| 2018/0150419 A1 | 5/2018 | Steinmacher-Burow |
| 2018/0150471 A1 | 5/2018 | Gopal |
| 2018/0150644 A1 | 5/2018 | Khanna |
| 2018/0151975 A1 | 5/2018 | Aoki |
| 2018/0152200 A1 | 5/2018 | Guilford |
| 2018/0152201 A1 | 5/2018 | Gopal |
| 2018/0152202 A1 | 5/2018 | Gopal |
| 2018/0152317 A1 | 5/2018 | Chang |
| 2018/0152366 A1 | 5/2018 | Cornett |
| 2018/0152383 A1 | 5/2018 | Burres |
| 2018/0152540 A1 | 5/2018 | Niell |
| 2018/0165199 A1 | 6/2018 | Brandt et al. |
| 2018/0205392 A1 | 7/2018 | Gopal |
| 2018/0293493 A1 | 10/2018 | Kalamkar et al. |
| 2019/0014396 A1 | 1/2019 | Adiletta |
| 2019/0021182 A1 | 1/2019 | Adiletta |
| 2019/0034102 A1 | 1/2019 | Miller |
| 2019/0034383 A1 | 1/2019 | Schmisseur |
| 2019/0034490 A1 | 1/2019 | Yap |
| 2019/0035483 A1 | 1/2019 | Schmisseur |
| 2019/0042090 A1 | 2/2019 | Raghunath |
| 2019/0042091 A1 | 2/2019 | Raghunath |
| 2019/0042122 A1 | 2/2019 | Schmisseur |
| 2019/0042126 A1 | 2/2019 | Sen |
| 2019/0042136 A1 | 2/2019 | Nachimuthu |
| 2019/0042234 A1 | 2/2019 | Bernat |
| 2019/0042277 A1 | 2/2019 | Nachimuthu |
| 2019/0042408 A1 | 2/2019 | Schmisseur |
| 2019/0042611 A1 | 2/2019 | Yap |
| 2019/0044809 A1 | 2/2019 | Willis |
| 2019/0044849 A1 | 2/2019 | Ganguli |
| 2019/0044859 A1 | 2/2019 | Sundar |
| 2019/0052457 A1 | 2/2019 | Connor |
| 2019/0062053 A1 | 2/2019 | Jensen |
| 2019/0065083 A1 | 2/2019 | Sen |
| 2019/0065112 A1 | 2/2019 | Schmisseur |
| 2019/0065172 A1 | 2/2019 | Nachimuthu |
| 2019/0065212 A1 | 2/2019 | Kumar |
| 2019/0065231 A1 | 2/2019 | Schmisseur |
| 2019/0065253 A1 | 2/2019 | Bernat |
| 2019/0065260 A1 | 2/2019 | Balle |
| 2019/0065261 A1 | 2/2019 | Narayan |
| 2019/0065281 A1 | 2/2019 | Bernat et al. |
| 2019/0065290 A1 | 2/2019 | Custodio |
| 2019/0065401 A1 | 2/2019 | Dormitzer |
| 2019/0065415 A1 | 2/2019 | Nachimuthu |
| 2019/0067848 A1 | 2/2019 | Aoki |
| 2019/0068444 A1 | 2/2019 | Grecco |
| 2019/0068464 A1 | 2/2019 | Bernat |
| 2019/0068466 A1 | 2/2019 | Chagam |
| 2019/0068509 A1 | 2/2019 | Hyatt |
| 2019/0068521 A1 | 2/2019 | Kumar |
| 2019/0068523 A1 | 2/2019 | Chagam |
| 2019/0068693 A1 | 2/2019 | Bernat |
| 2019/0068696 A1 | 2/2019 | Sen |
| 2019/0068698 A1 | 2/2019 | Kumar |
| 2019/0069433 A1 | 2/2019 | Balle |
| 2019/0069434 A1 | 2/2019 | Aoki |
| 2019/0129874 A1 | 5/2019 | Huang et al. |

(56) References Cited

U.S. PATENT DOCUMENTS

| | | |
|---|---|---|
| 2019/0196824 A1 | 6/2019 | Liu |
| 2019/0205745 A1 | 7/2019 | Sridharan et al. |
| 2019/0307014 A1 | 10/2019 | Adiletta |
| 2019/0342642 A1 | 11/2019 | Adiletta |
| 2019/0342643 A1 | 11/2019 | Adiletta |
| 2019/0387291 A1 | 12/2019 | Adiletta |
| 2020/0007511 A1 | 1/2020 | Van de Groenendaal et al. |
| 2020/0226027 A1 | 7/2020 | Krasner et al. |
| 2020/0241926 A1 | 7/2020 | Guim Bernat |
| 2020/0341810 A1 | 10/2020 | Ranganathan et al. |
| 2021/0103544 A1 | 4/2021 | Guim Bernat et al. |
| 2021/0209035 A1 | 7/2021 | Galbi et al. |
| 2021/0377140 A1 | 12/2021 | Adiletta |

FOREIGN PATENT DOCUMENTS

| | | |
|---|---|---|
| CN | 1816003 | 8/2006 |
| CN | 101154256 | 4/2008 |
| CN | 103634330 | 3/2014 |
| CN | 105183561 | 12/2015 |
| CN | 105721358 | 6/2016 |
| CN | 105979007 | 9/2016 |
| DE | 112015006944 | 3/2023 |
| JP | 2002158733 | 5/2002 |
| WO | 2017052575 | 3/2017 |
| WO | 2017105733 | 6/2017 |
| WO | 2018102414 | 6/2018 |
| WO | 2018111228 | 6/2018 |
| WO | 2020190801 | 9/2020 |

OTHER PUBLICATIONS

Communication pursuant to Article 94(3) for European Patent Application No. 18191345.0, dated Apr. 16, 2021.
Corrected Notice of Allowability for U.S. Appl. No. 17/015,479, dated Jun. 3, 2021.
Extended European Search Report for European Patent Application No. 181934.0, dated Feb. 11, 2019.
Extended European Search Report for European Patent Application No. 20217841.4, dated Apr. 16, 2021.
Final Office Action for U.S. Appl. No. 15/719,770, dated Jun. 24, 2020.
Final Office Action from U.S. Appl. No. 17/125,420 notified Oct. 13, 2023, 19 pgs.
International Preliminary Report on Patentability for PCT Application No. PCT/US2016/062139, dated Jun. 28, 2018.
International Preliminary Report on Patentability for PCT Application No. PCT/US2017/038552, mailed Jan. 22, 2019.
International Preliminary Report on Patentability for PCT Application No. PCT/US2017/063765, dated Jun. 4, 2019.
International Search Report and Written Opinion for PCT Application No. PCT/US2017/038552, dated Oct. 11, 2017, 3 pages.
International Search Report and Written Opinion for PCT Application No. PCT/US2017/063756, dated Feb. 23, 2018.
International Search Report and Written Opinion for PCT Application No. PCT/US2021/051801, dated Jan. 3, 2022.
International Search Report and Written Opinion issued in PCT Application No. PCT/US2016/062139, dated Feb. 23, 2017, 13 pages.
Non-Final Office Action from U.S. Appl. No. 17/221,541 notified Aug. 1, 2023, 15 pgs.
Non-Final Office Action from U.S. Appl. No. 17/681,025 notified Jun. 23, 2023, 8 pgs.
Non-Final Office Action from U.S. Appl. No. 18/103,739 notified Jun. 29, 2023, 11 pgs.
Non-Final Office Action from U.S. Appl. No. 18/116,957 notified Jun. 30, 2023, 27 pgs.
Non-Published commonly owned U.S. Appl. No. 17/221,541, filed Apr. 2, 2021, 60 pages, Intel Corporation.
Non-Published commonly owned U.S. Appl. No. 17/214,605, filed Mar. 26, 2021, 75 pages, Intel Corporation.
Notice of Allowance for Chinese Patent Application No. 201680067500.4, dated Apr. 6, 2022.
Notice of Allowance for Chinese Patent Application No. 20170038785.3, dated Jul. 13, 2022.
Notice of Allowance for U.S. Appl. No. 15/060,844, dated Mar. 6, 2019, 5 pages.
Notice of Allowance for U.S. Appl. No. 15/395,203, dated Apr. 10, 2018.
Notice of Allowance for U.S. Appl. No. 15/719,770, dated Jun. 17, 2021.
Notice of Allowance for U.S. Appl. No. 15/719,770, dated Mar. 1, 2021.
Notice of Allowance for U.S. Appl. No. 15/721,829, dated Jan. 22, 2021.
Notice of Allowance for U.S. Appl. No. 15/721,829, dated Sep. 11, 2020.
Notice of Allowance for U.S. Appl. No. 16/055,602, dated Feb. 13, 2020.
Notice of Allowance for U.S. Appl. No. 16/055,602, dated Oct. 28, 2019.
Notice of Allowance for U.S. Appl. No. 16/344,582, dated Jan. 12, 2021.
Notice of Allowance for U.S. Appl. No. 16/433,709, dated Nov. 23, 2022.
Notice of Allowance for U.S. Appl. No. 16/513,345, dated Jun. 5, 2020.
Notice of Allowance for U.S. Appl. No. 16/513,345, dated May 19, 2020.
Notice of Allowance for U.S. Appl. No. 16/513,371, dated Jan. 31, 2020.
Notice of Allowance for U.S. Appl. No. 16/513,371, dated Jun. 5, 2020.
Notice of Allowance for U.S. Appl. No. 16/513,371, dated May 20, 2020.
Notice of Allowance for U.S. Appl. No. 17/015,479, dated May 26, 2021.
Notice of Allowance for U.S. Appl. No. 17/246,388, dated Dec. 13, 2022.
Notice of Allowance for U.S. Appl. No. 17/404,749, dated Nov. 9, 2022.
Notice of Allowance from U.S. Appl. No. 17/496,146 notified Apr. 28, 2023, 15 pgs.
Notice of Allowance from U.S. Appl. No. 17/681,025 notified Oct. 17, 2023, 14 pgs.
Notice of Panel Decision from Pre-Appeal Brief Review issued in U.S. Appl. No. 15/060,844, dated Mar. 1, 2019, 2 pages.
Office Action for U.S. Appl. No. 15/396,014 dated Nov. 4, 2019.
Office Action for U.S. Appl. No. 15/060,844, dated Apr. 25, 2018, 6 pages.
Office Action for U.S. Appl. No. 15/060,844, dated Sep. 8, 2017, 11 pages.
Office Action for U.S. Appl. No. 15/060,844, dated Nov. 21, 2018, 7 pages.
Office Action for U.S. Appl. No. 15/395,203, dated Dec. 1, 2017.
Office Action for U.S. Appl. No. 15/396,014, dated May 10, 2022.
Office Action for U.S. Appl. No. 15/396,014, dated May 14, 2020.
Office Action for U.S. Appl. No. 15/396,014, dated Nov. 3, 2022.
Office Action for U.S. Appl. No. 15/719,770, dated Dec. 27, 2019.
Office Action for U.S. Appl. No. 15/721,829 dated Dec. 23, 2019.
Office Action for U.S. Appl. No. 15/721,829, dated May 13, 2020.
Office Action for U.S. Appl. No. 16/055,602 dated Mar. 27, 2019.
Office Action for U.S. Appl. No. 16/055,602, dated Aug. 15, 2019.
Office Action for U.S. Appl. No. 16/344,582, dated Jul. 22, 2020.
Office Action for U.S. Appl. No. 16/433,709, dated Mar. 17, 2022.
Office Action for U.S. Appl. No. 16/433,709, dated May 25, 2022.
Office Action for U.S. Appl. No. 16/433,709, dated Sep. 7, 2021.
Office Action for U.S. Appl. No. 16/513,345, dated Jan. 31, 2020.
Office Action for U.S. Appl. No. 17/015,479, dated Feb. 12, 2021.
Office Action for U.S. Appl. No. 17/221,541, dated Mar. 15, 2023.
Office Action for U.S. Appl. No. 17/221,541, dated Oct. 25, 2022.
Office Action for U.S. Appl. No. 17/246,388, dated Jul. 21, 2022.

(56) References Cited

OTHER PUBLICATIONS

Office Action for U.S. Appl. No. 17/404,749, dated Jul. 27, 2022.
Office Action for U.S. Appl. No. 17/496,146, dated Dec. 22, 2022.
Office Action from Chinese Patent Application No. 202110060921.7 notified Sep. 11, 2023, 5 pgs.
Office Action from European Patent Application No. 20217841.4 notified May 25, 2023, 9 pgs.
Office Action in Chinese Patent Application No. 201680067500.4, dated Sep. 8, 2021.
Restriction Requirement for U.S. Appl. No. 16/433,709, dated Mar. 12, 2021.
Summons to attend oral proceedings pursuant to Rule 115(1) for European Patent Application No. 18191345.0, dated Aug. 23, 2022.
Translation of Office Action and Search Report for Chinese Patent Application No. 201780038785.3, dated Feb. 18, 2022.
USPTO Notice of Improper Request for Corrected Filing Receipt for U.S. Appl. No. 18/103,739 dated Feb. 24, 2023.
"Directory-Based Cache Coherence", Parallel Computer Architecture and Programming, CMU 15-418/15-618, Spring 2019.
"Network Functions Virtualisation (NFV); Architectural Framework", ETSI GS NFV 002, V1.2.1, Dec. 2014, 21 pages.
"Secure In-Field Firmware Updates for MSP MCUs", Texas Instruments, Application Report, Nov. 2015.
Artail , et al., "Speedy Cloud: Cloud Computing with Support for Hardware Acceleration Services", 2017 IEEE, pp. 850-865.
Asiatici, et al., "Virtualized Execution Runtime for FPGA Accelerators in the Cloud", 2017 IEEE, pp. 1900-1910.
Burdeniuk, et al., "An Event-Assisted Sequencer to Accelerate Matrix Algorithms", 2010 IEEE, pp. 158-163.
Caulfield, et al., "A Cloud-scale acceleration Architecture", Microsoft Corp., Oct. 2016, 13 pages.
Denneman, Frank, "Numa Deep Dive Part 3: Cache Coherency", https://frankdenneman.nl/2016/07/11/numa-deep-dive-part-3-cache-coherency/, Jul. 11, 2016.
Diamantopoulos, et al., "High-level Synthesizable Dataflow MapReduce Accelerator for FPGA-coupled Data Centers", 2015 IEEE, pp. 26-33.
Ding, et al., "A Unified OpenCL-flavor Programming Model with Scalable Hybrid Hardware Platform on FPGAs", 2014 IEEE, 7 pages.
Fahmy, et al., "Virtualized FPGA Accelerators for Efficient Cloud Computing", IEEE, pp. 430-435, 2015.
Fahmy Suhaib, et al., "Virtualized FPGA Accelerators for Efficient Cloud Computing", 2015 IEEE 7th International Conference on Cloud Computing Technology and Science (Cloudcom), IEEE, Nov. 30, 2015, pp. 430-435.
Gorman, Mel, et al., "Optimizing Linux for AMD EPYC 7002 Series Processors with SUSE Linux Enterprise 15 SP1", SUSE Best Practices, Nov. 2019.
Ronciak, John A., et al., "Page-Flip Technology for use within the Linux Networking Stack", Proceedings of the Linux Symposium, vol. Two, Jul. 2004.
Satyanarayanan, et al., "The Case for VM-Based Cloudlets in Mobile Computing", IEEE Pervasive Computing, vol. 8, Issue 4, pp. 14-23, Oct. 6, 2009.
Shade, L.K., "Implementing Secure Remote Firmware Updates", Embedded Systems Conference Silicon Valley, 2011, May 2011.
Non-Final Office Action from U.S. Appl. No. 18/076,104 notified Dec. 12, 2023, 11 pgs.
Office Action from Chinese Patent Application No. 201811006541.X notified Dec. 6, 2023, 10 pgs.
Office Action from Chinese Patent Application No. 201811004538.4 notified Dec. 25, 2023, 11 pgs.
Noting of loss of rights pursuant to Rule 112(1) EPC from European Patent Application No. notified Jan. 3, 2024, 2 pgs.
Final Office Action from U.S. Appl. No. 17/221,541 notified Jan. 17, 2024, 21 pgs.
Non-Final Office Action from U.S. Appl. No. 18/238,096 notified Sep. 26, 2024, 12 pgs.
Non-Final Office Action from U.S. Appl. No. 18/542,308 notified Aug. 28, 2024, 14 pgs.
Notice of Allowance from Chinese Patent Application No. 201811004538.4 notified Aug. 12, 2024, 7 pgs.
Notice of Allowance from Chinese Patent Application No. 202110060921.7 notified Feb. 23, 2024, 8 pgs.
Notice of Allowance from U.S. Appl. No. 17/125,420 notified Jan. 10, 2024, 14 pgs.
Notice of Allowance from U.S. Appl. No. 18/076,104 notified Mar. 26, 2024, 12 pgs.
Notice of Allowance from U.S. Appl. No. 18/103,739 notified Jan. 18, 2024, 12 pgs.
Notice of Allowance from U.S. Appl. No. 18/116,957 notified Jan. 19, 2024, 12 pgs.
Notice of Allowance from U.S. Appl. No. 18/116,957 notified May 1, 2024, 14 pgs.
Notice of Allowance from U.S. Appl. No. 18/223,399 notified Jul. 31, 2024, 5 pgs.
Notice of Allowance from U.S. Appl. No. 18/223,399 notified Nov. 27, 2024, 14 pgs.
Office Action from Chinese Patent Application No. 201811004538.4 notified Jun. 17, 2024, 18 pgs.

TECHNOLOGIES FOR DIVIDING WORK ACROSS ACCELERATOR DEVICES

CLAIM OF PRIORITY

This application is a continuation of prior co-pending U.S. patent application Ser. No. 17/681,025, filed Feb. 25, 2022 and titled "TECHNOLOGIES FOR DIVIDING WORK ACROSS ACCELERATOR DEVICES," which is a continuation of U.S. patent application Ser. No. 17/321,186, filed May 14, 2021 and titled "TECHNOLOGIES FOR DIVIDING WORK ACROSS ACCELERATOR DEVICES," and is now U.S. Pat. No. 11,429,297, which is a continuation of prior U.S. patent application Ser. No. 15/721,829, filed Sep. 30, 2017 and titled "TECHNOLOGIES FOR DIVIDING WORK ACROSS ACCELERATOR DEVICES," and is now U.S. Pat. No. 11,029,870, which claims the benefit of prior Indian Provisional Patent Application No. 201741030632, filed Aug. 30, 2017 and prior U.S. Provisional Patent Application No. 62/427,268, filed Nov. 29, 2016 and titled "FRAMEWORK AND TECHNIQUES FOR POOLS OF CONFIGURABLE COMPUTING RESOURCES." Each of the aforesaid prior Patent Applications is hereby incorporated herein by reference in its entirety.

BACKGROUND

Demand for accelerator devices has continued to increase because the accelerator devices are becoming more important as they may be used in various technological areas, such as machine learning and genomics. Typical architectures for accelerator devices, such as field programmable gate arrays (FPGAs), cryptography accelerators, graphics accelerators, and/or compression accelerators (referred to herein as "accelerator devices," "accelerators," or "accelerator resources") capable of accelerating the execution of a set of operations in a workload (e.g., processes, applications, services, etc.) may allow static assignment of specified amounts of shared resources of the accelerator device (e.g., high bandwidth memory, data storage, etc.) among different portions of the logic (e.g., circuitry) of the accelerator device. Typically, the workload is allocated with the required processor(s), memory, and accelerator device(s) for the duration of the workload. The workload may use its allocated accelerator device at any point of time; however, in many cases, the accelerator devices will remain idle leading to wastage of resources.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
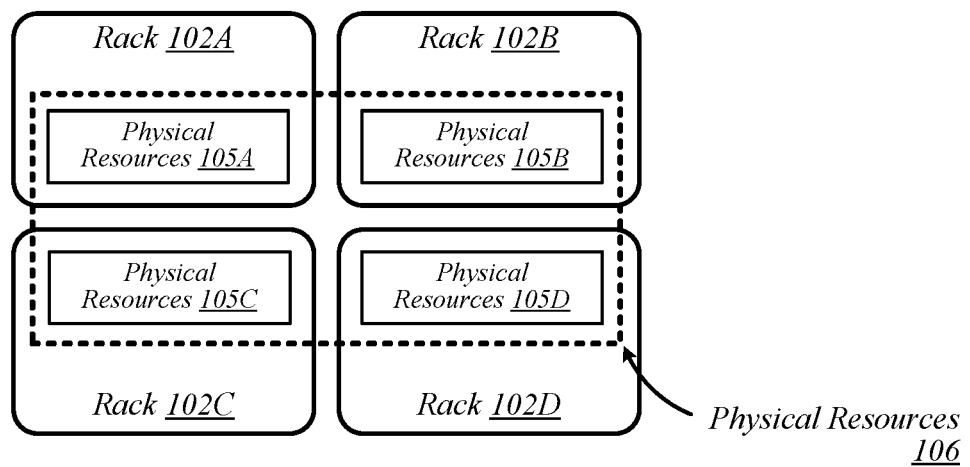
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
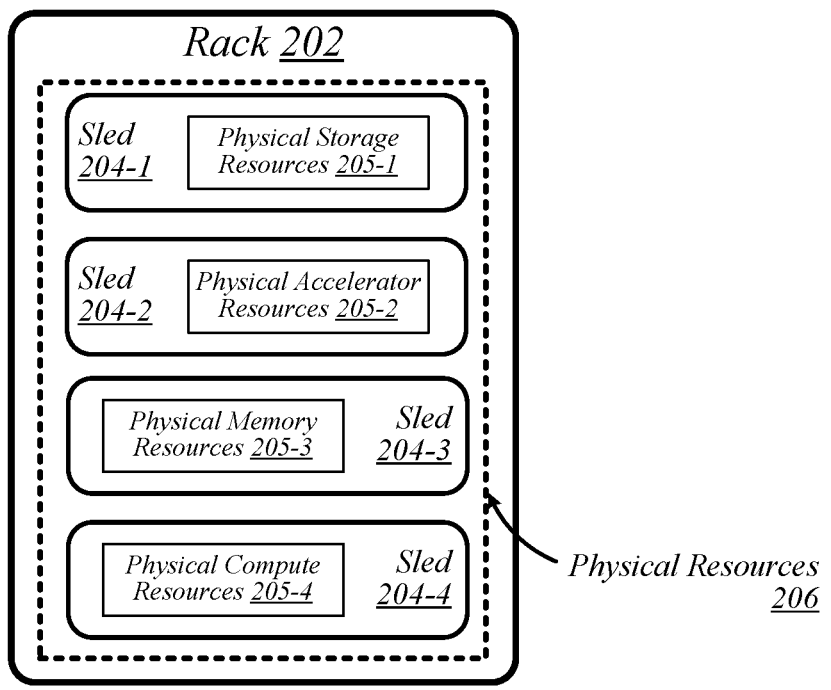
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
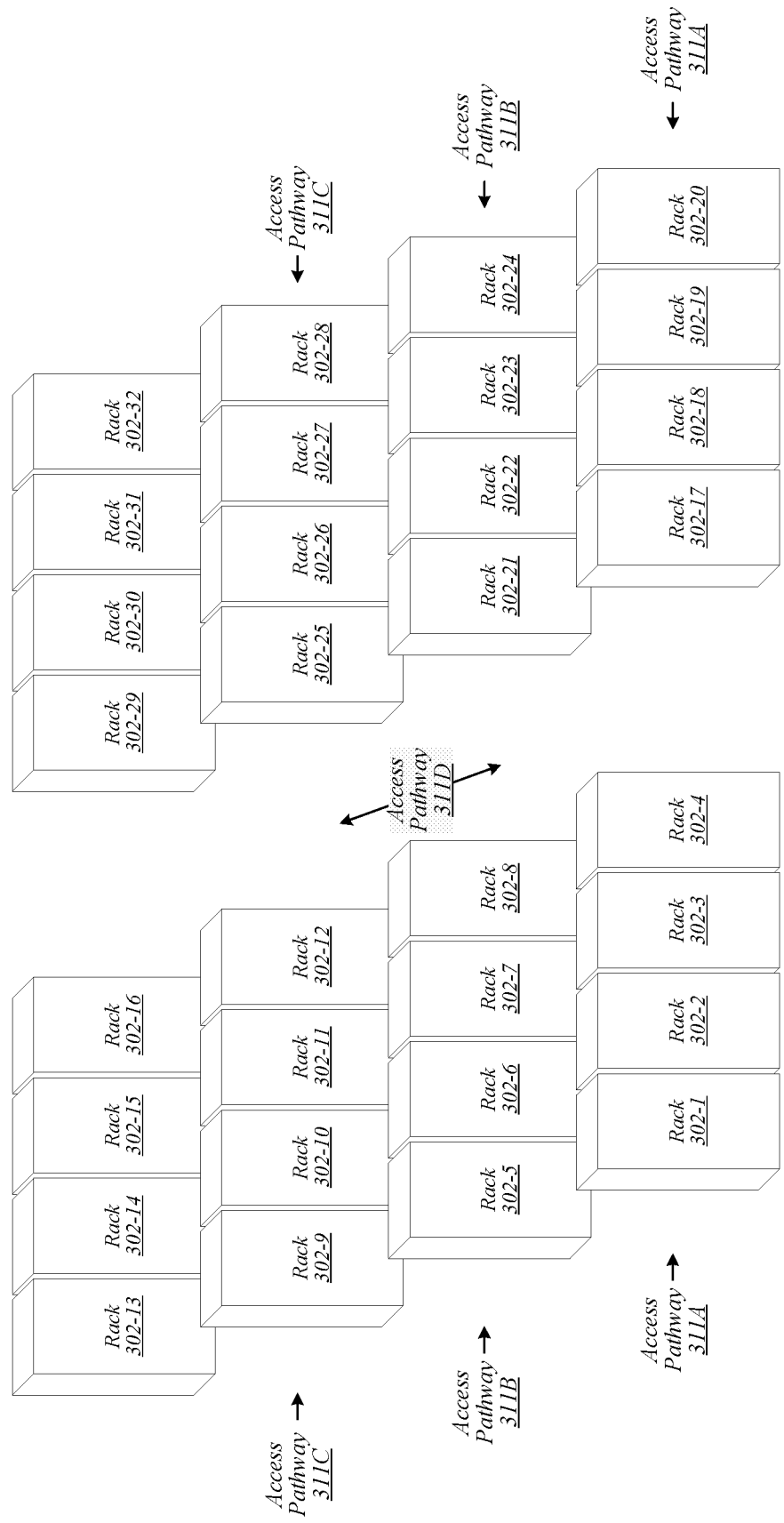
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
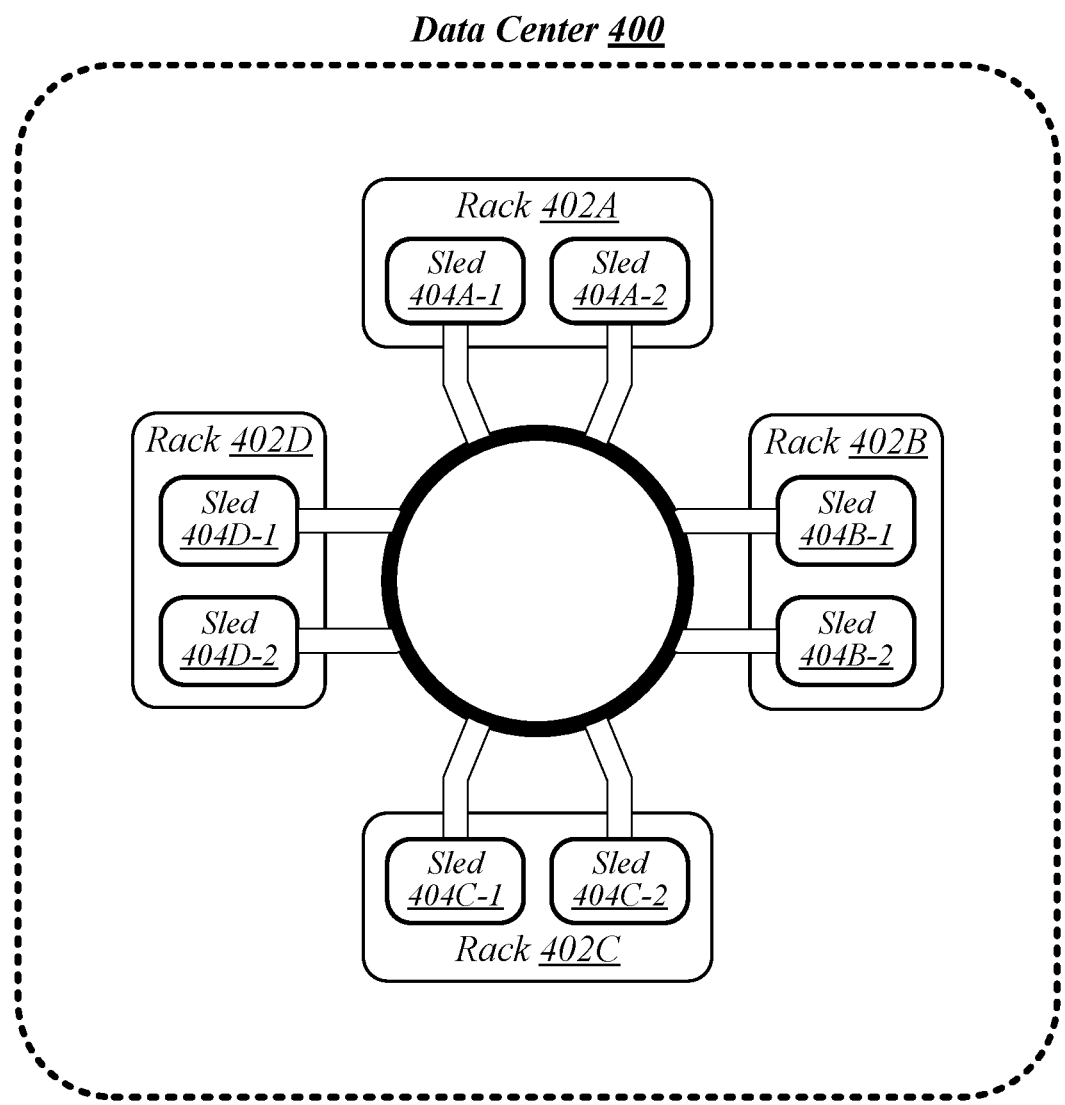
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
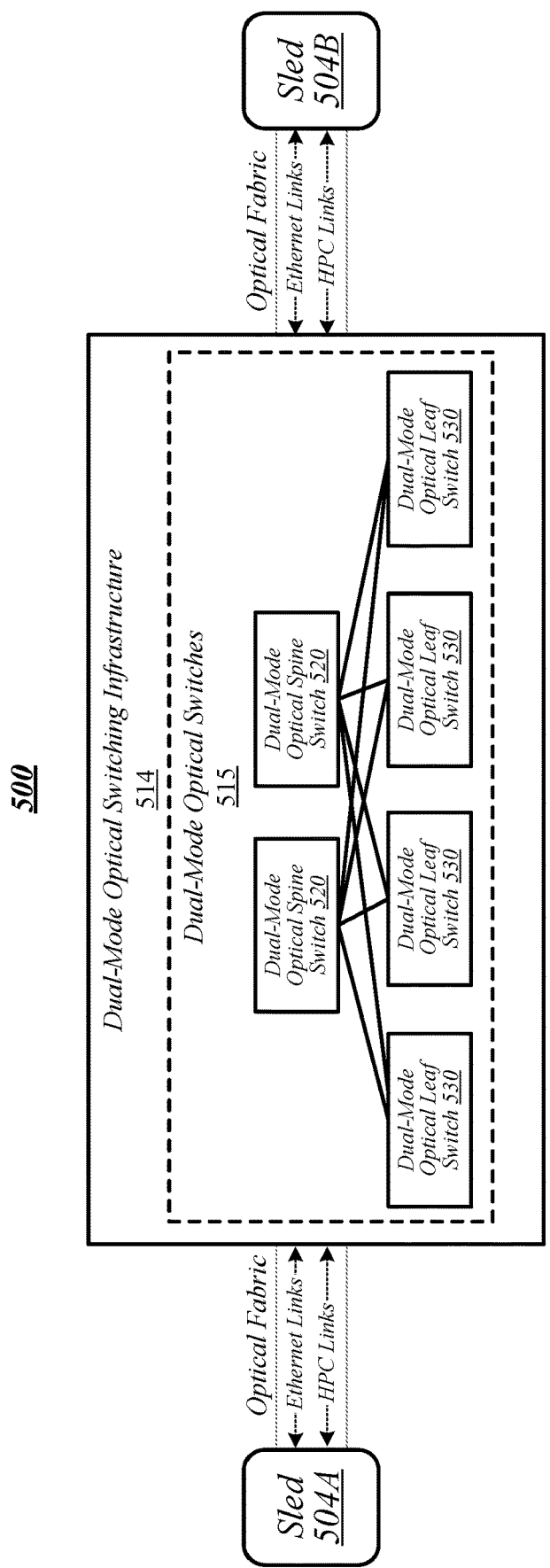
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
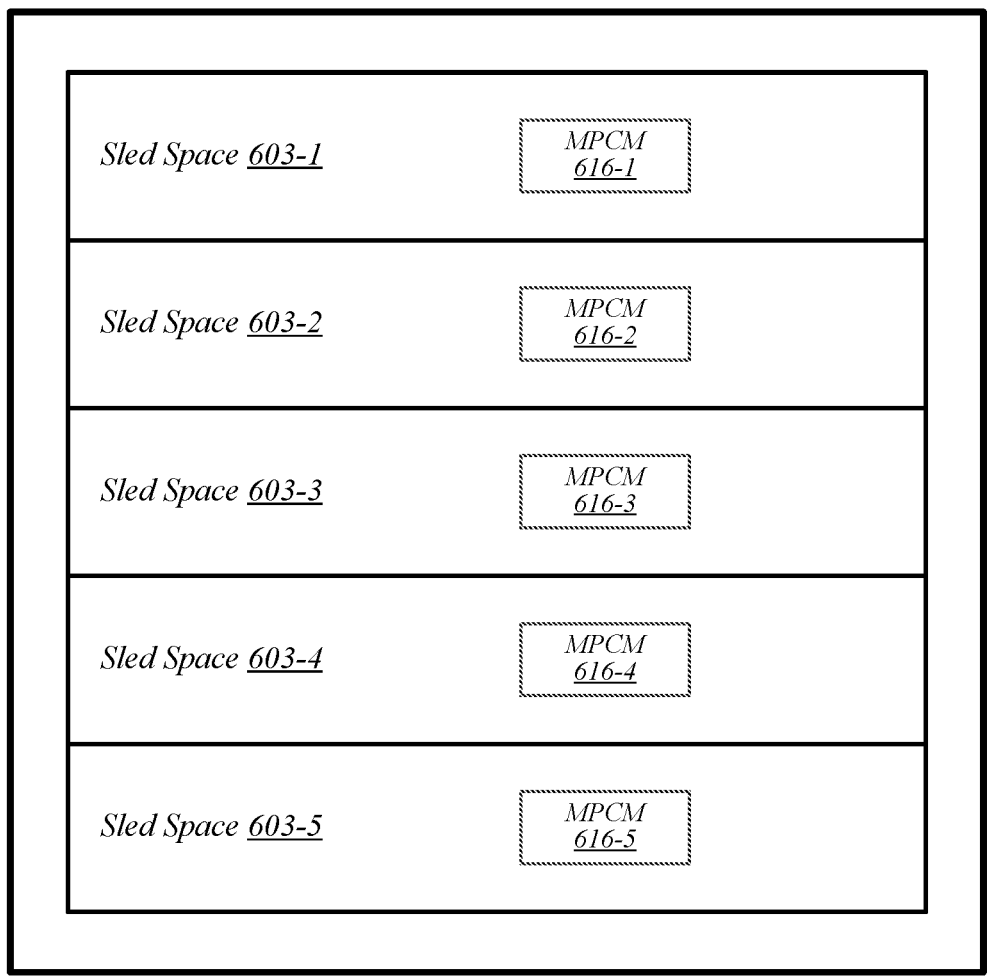
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
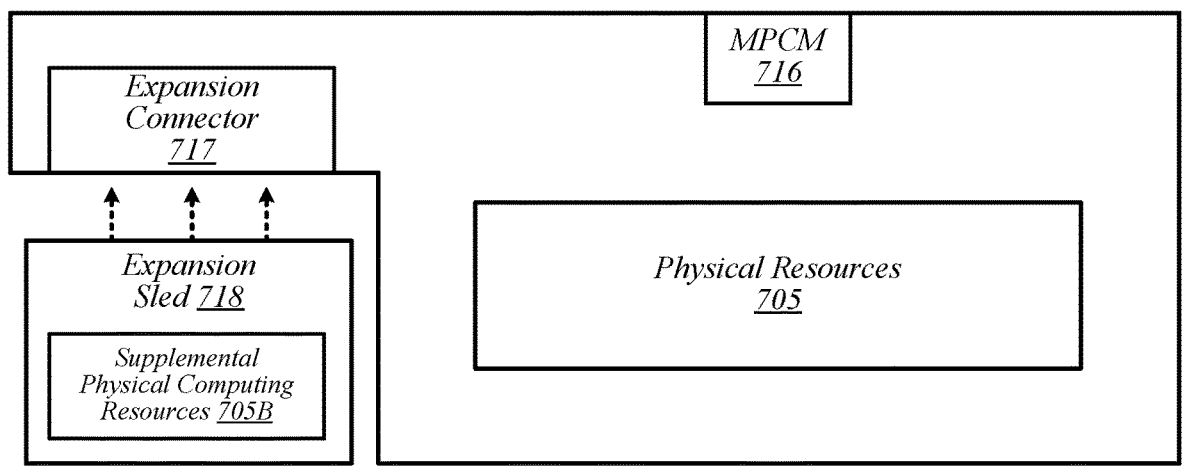
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
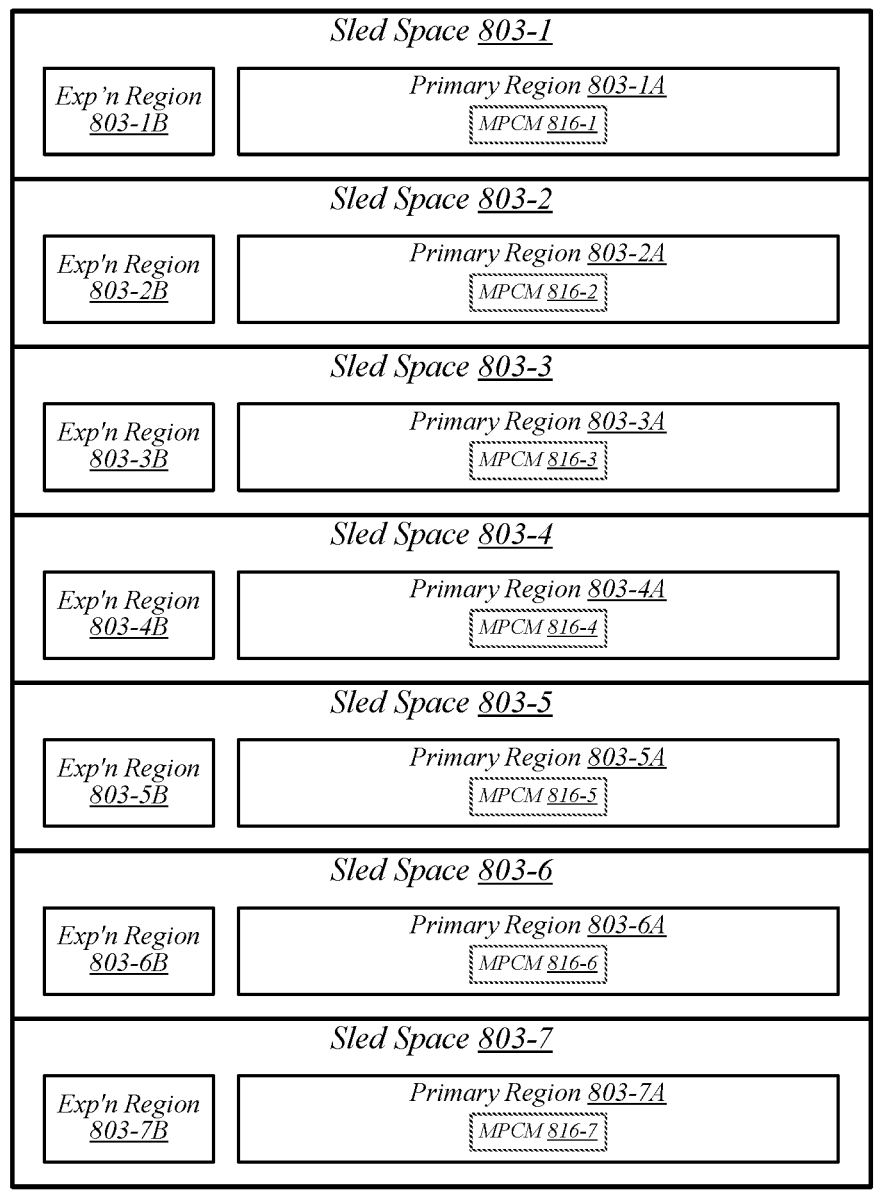
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
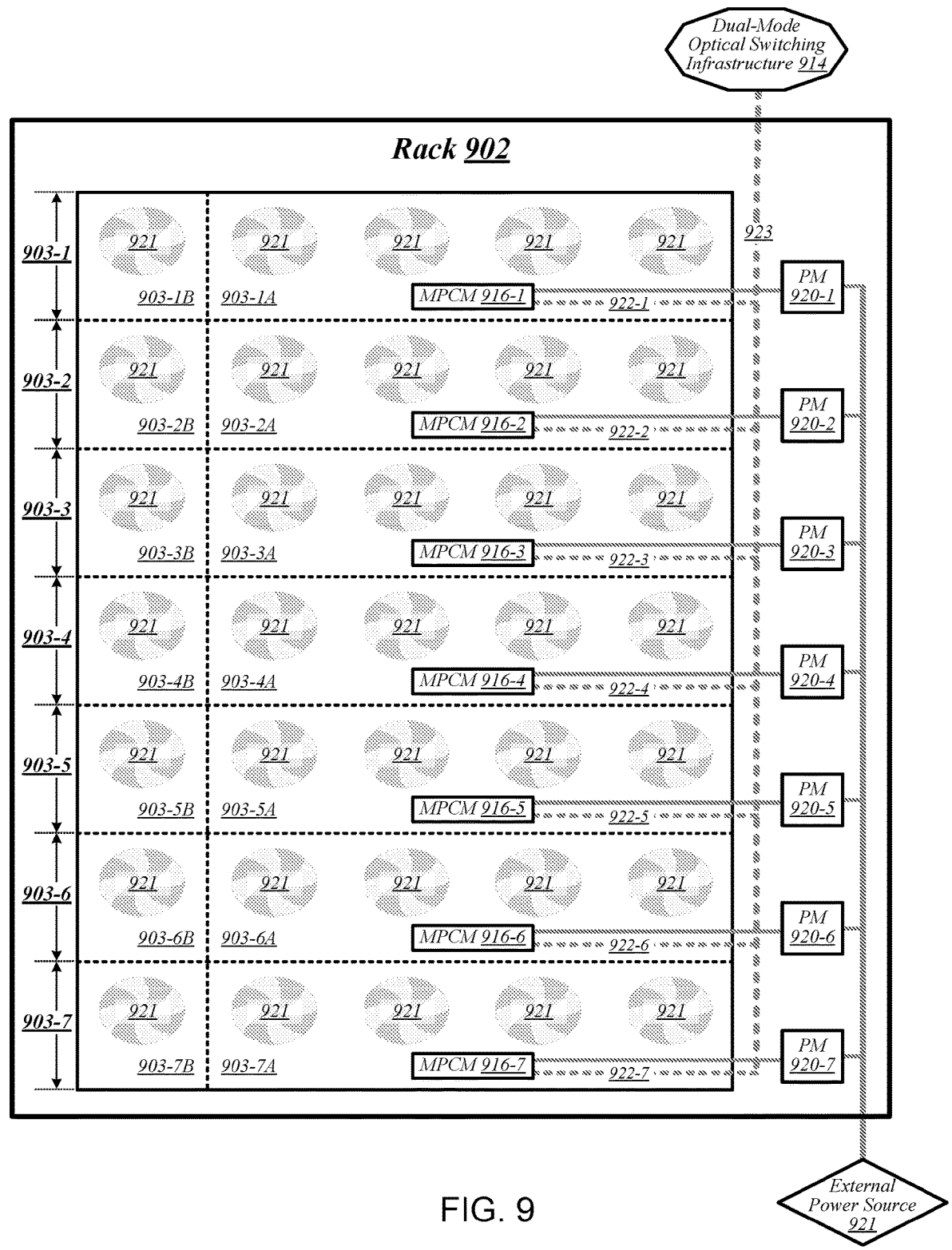
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1 U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
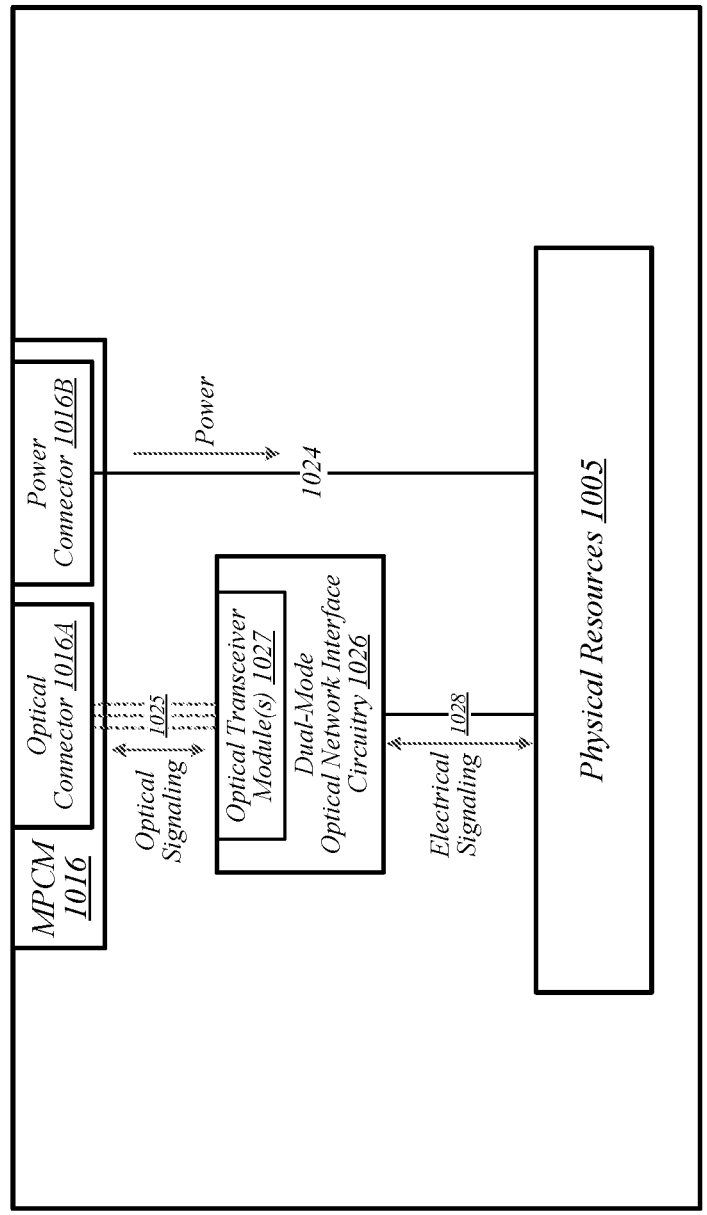
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
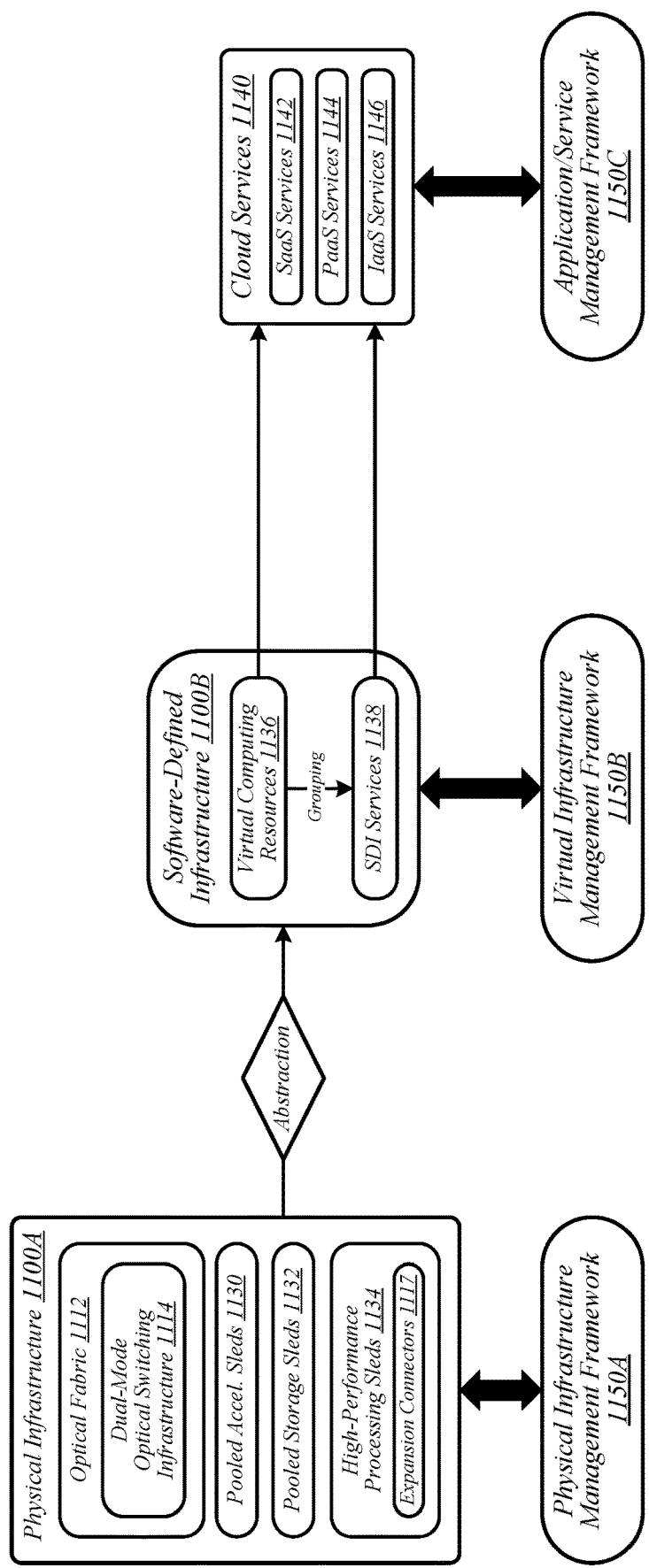
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
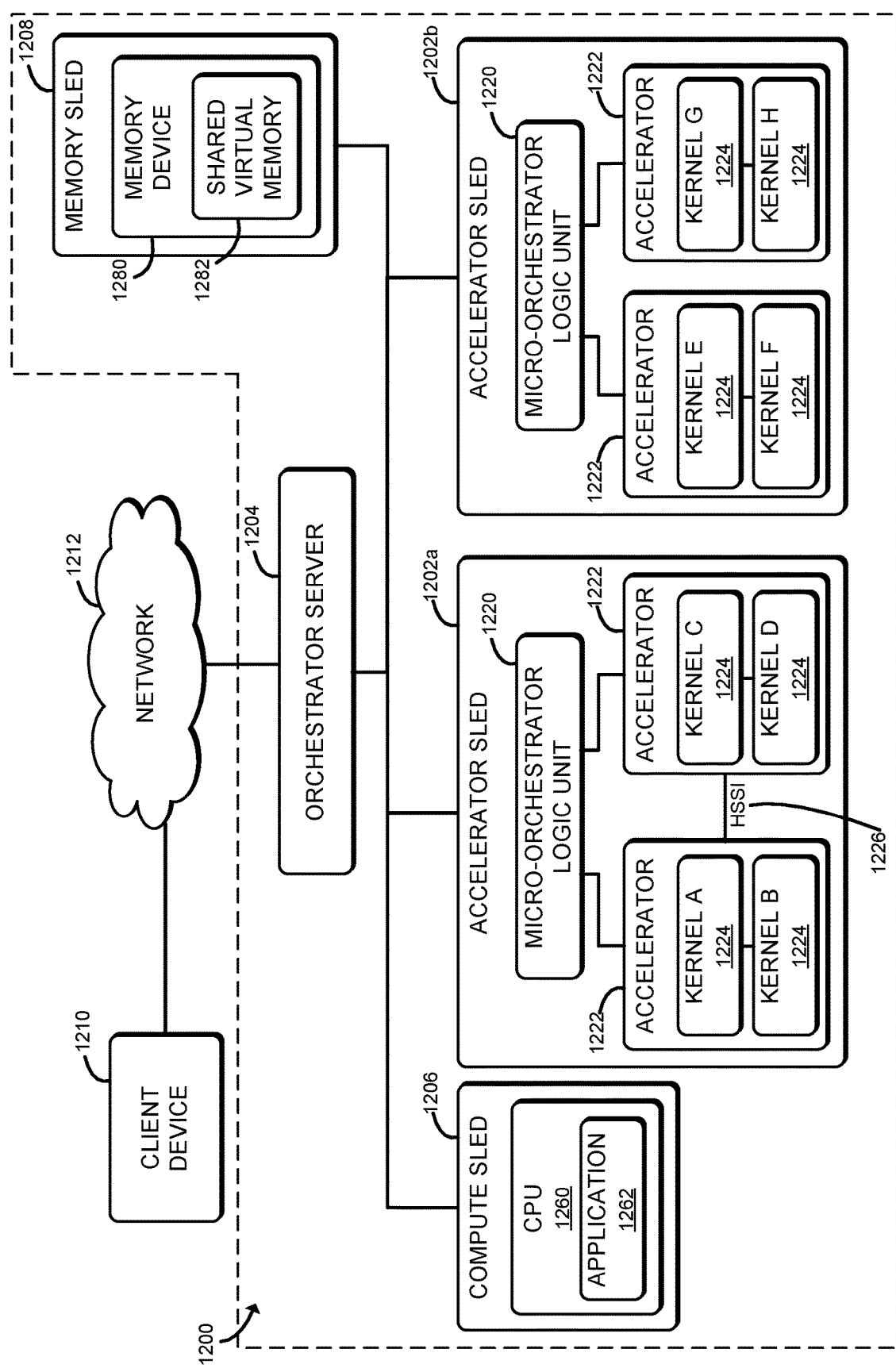
FIG. 12 is a simplified block diagram of at least one embodiment of a system for dividing work across one or more accelerator devices.

Referring now to FIG. 12, a system 1200, which may be implemented in accordance with the data centers 100, 300, 400, 1100 described above with reference to FIGS. 1, 3, 4, and 11, for dividing work across one or more accelerator devices includes an orchestrator server 1204 in communication with accelerator sleds 1202 (e.g., physical accelerator resources 205-2 or pooled accelerator sleds 1130), a compute sled 1206 (e.g., physical compute resources 205-4), and a memory sled 1208 (e.g., physical memory resources 205-3) from the same or different racks (e.g., one or more of racks 302-1 through 302-32). In use, a micro-orchestrator logic unit 1220 of each accelerator sled 1204 is configured to receive a job requested to be accelerated from the compute sled 1206 executing (e.g., with a central processing unit (CPU) 1262) an application 1262 (e.g., a workload). The micro-orchestrator logic unit 1220 is configured to analyze the requested job in order to determine how to divide the job into multiple tasks (e.g., operations, processes, functions, etc.) that may be executed in parallel on one or more accelerator devices 1222 to maximize the parallelization of the tasks to minimize an amount of time required to complete the requested job. It should be appreciated that each accelerator device 1222 may concurrently execute more than one task. In some embodiments, the orchestrator server 1204 may choose to determine how to divide the tasks across one or more accelerator devices 1222 on the same or different accelerator sleds 1202, such as based on a job analysis received from the micro-orchestrator logic unit 1220 of each accelerator sleds 1202.

While two accelerator sleds 1202, one compute sled 1206, and one memory sled 1208 are shown in FIG. 12, it should be understood that in other embodiments, the system 1200 may include a different number of accelerator sleds 1202, the compute sleds 1206, memory sleds 1208, and/or other sleds (e.g., storage sleds). The system 1200 may be located in a data center and provide storage and compute services (e.g., cloud services) to a client device 1210 that is in communication with the system 1200 through a network 1212. The orchestrator server 1204 may support a cloud operating environment, such as OpenStack, and the accelerator sleds 1202, the compute sled 1206, and the storage sled 1208 may execute one or more applications or processes (i.e., workloads), such as in virtual machines or containers.

As shown in FIG. 12, the client device 1210, the orchestrator server 1204, and the sleds of the system 1200 (e.g., the accelerator sleds 1202, the compute sled 1206, and the memory sled 1208) are illustratively in communication via the network 1212, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

In the illustrative embodiment, each accelerator sled 1202 includes the micro-orchestrator logic unit 1220 and two accelerator devices 1222, and each accelerator device 1222 includes two kernels (e.g., each a set of circuitry and/or executable code usable to implement a set of functions) 1224. It should be appreciated that, in other embodiments, each orchestrator sled 1202 may include a different number of accelerator devices 1222, and each accelerator device 1222 may include a different number of kernels 1224. It should be appreciated that some accelerator sleds 1202 (e.g., the accelerator sled 1202a) may include an inter-accelerator communication interface 1226 (e.g., a high speed serial interface (HSSI)) between the accelerator devices 1222. The inter-accelerator communication interface 1226 is configured to communicatively connect the accelerator devices 1222 of the accelerator sled 1202a to share data. For example, accelerator devices 1222 concurrently executing tasks that share a data set may access to the same data set at the same time in order to read from and/or write to different parts of the data set. To do so, the accelerator devices 1222 of the accelerator sled 1202a share the data set via the inter-accelerator communication interface 1226. Alternatively, in some embodiments, the accelerator devices 1222 may share data that is present in shared memory (e.g., a shared virtual memory 1282). It should be appreciated that, in such embodiments, the accelerator devices 1222 need not be on the same accelerator sled 1202 to concurrently execute tasks that share the data.

The memory sled 1208, in the illustrative embodiment, includes a memory device 1280, which further includes the shared virtual memory 1282. As described above, the shared virtual memory 1282 may hold data that can be accessed by any of the accelerator devices 1222 capable of utilizing shared virtual memory. For example, the accelerator devices 1222 on an accelerator sled 1202 (e.g., the accelerator sled 1202b) that does not have an inter-accelerator communication interface 1226 (e.g., a HSSI) may use the shared data stored in the shared virtual memory 1282 to execute tasks in parallel. Additionally, the accelerator devices 1222 on different accelerator sleds 1202 (e.g., accelerator sleds 1202a, 1202b) may use the shared data stored in the shared virtual memory 1282 to execute the tasks in parallel. It should be appreciated that, in some embodiments, the accelerator devices 1222 that are communicatively connected to each other via the HSSI 1226 may share data via the shared virtual memory 1282 and/or the inter-accelerator communication interface 1226, as dictated by a micro-orchestrator logic unit 1220 and/or the orchestrator server 1204.

Figure 13:
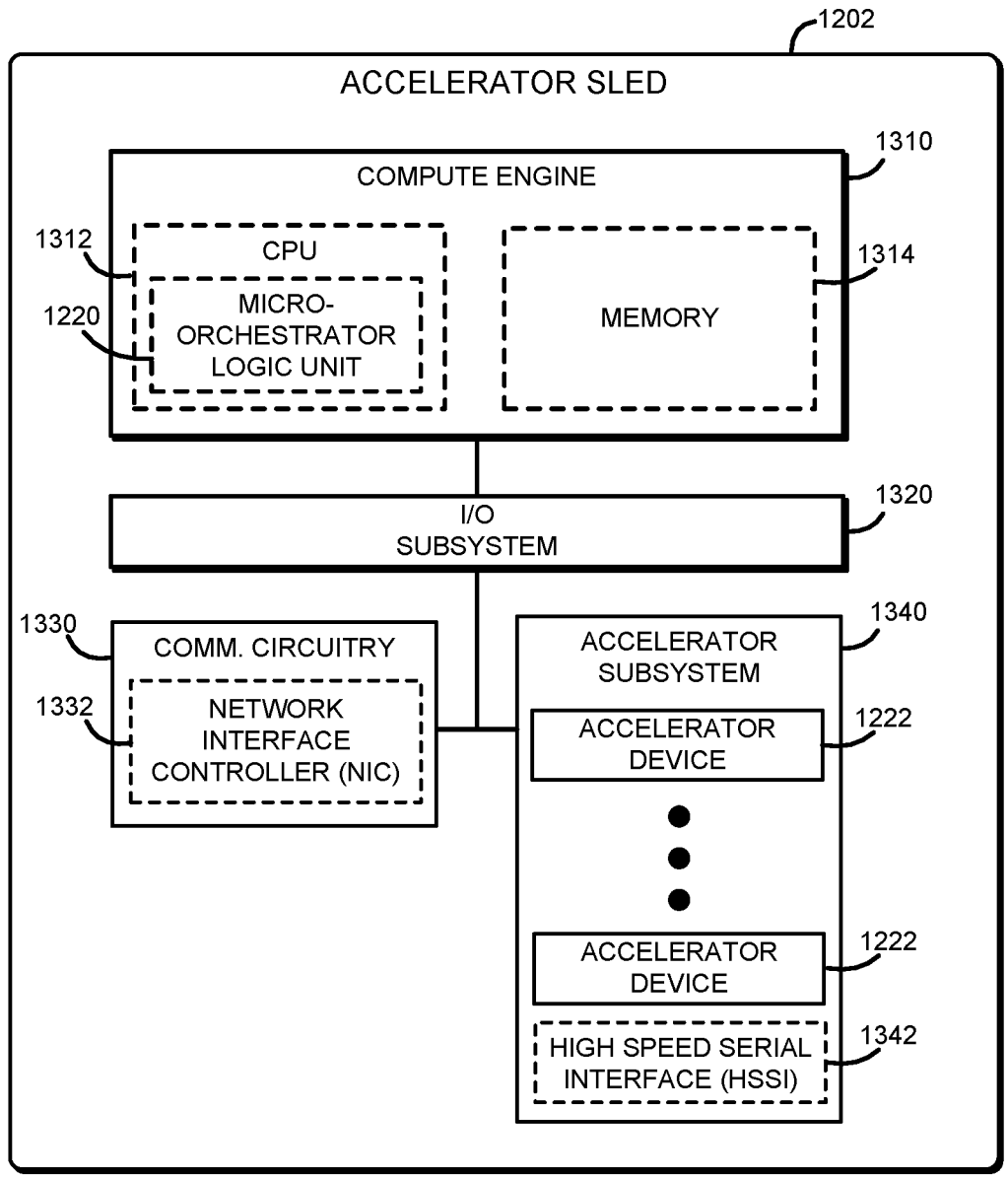
FIG. 13 is a is a simplified block diagram of an accelerator sled of FIG. 12.

Referring now to FIG. 13, each accelerator sled 1202 may be embodied as any type of compute device capable of performing the functions described herein. For example, the accelerator sled 1202 may be embodied as a sled 204-2 with physical accelerator resources 205-2, a computer, a server, a multiprocessor system, a network appliance (e.g., physical or virtual), a desktop computer, a workstation, a laptop computer, a notebook computer, a processor-based system, or a network appliance. As shown in FIG. 13, the illustrative accelerator sled 1202 includes a compute engine 1310, an input/output ("I/O") subsystem 1320, communication circuitry 1330, and an accelerator subsystem 1340. It should be appreciated that the accelerator sled 1202 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 1310 may be embodied as any type of device or collection of devices capable of performing the various compute functions as described below. In some embodiments, the compute engine 1310 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 1310 may include, or may be embodied as, a CPU 1312 and memory 1314. The CPU 1312 may be embodied as any type of processor capable of performing the functions described herein. For example, the CPU 1312 may be embodied as a single or multi-core processor(s), digital signal processor, microcontroller, or other processor or processing/controlling circuit.

In some embodiments, the CPU 1312 may include a micro-orchestrator logic unit 1220 which may be embodied as any device or circuitry capable of determining the capabilities (e.g., functions that each accelerator device 1222 is capable of accelerating, the present load on each accelerator device 1222, whether each accelerator device 1222 is capable of accessing shared memory or communicating through an inter-accelerator communication interface, etc.) of the accelerator devices 1222 on the accelerator sled 1202, and dynamically dividing a job into tasks to be performed by one or more of the accelerator devices 1222 as a function of the determined capabilities of the accelerator devices 1222 and identified tasks within the job that would benefit from different types of acceleration (e.g., cryptographic acceleration, compression acceleration, parallel execution, etc.). For example, the micro-orchestrator logic unit 1220 may be embodied as a co-processor, embedded circuit, ASIC, FPGA, and/or other specialized circuitry. The micro-orchestrator logic unit 1220 may receive a request directly from a compute sled 1206 executing an application with a job to be accelerated. Alternatively, the micro-orchestrator logic unit 1220 may receive a request from the orchestrator server 1204 with a job to be accelerated. Subsequently, the micro-orchestrator logic unit 1220 may analyze the code (e.g., microcode) of the requested job to identify one or more functions (e.g., tasks) in the code that may be parallelized. Based on the analysis of the requested job, the micro-orchestrator logic unit 1220 may divide the functions of the job into multiple tasks that may be executed in parallel on one or more accelerator devices 1222 on the accelerator sled 1202. Additionally or alternatively, in some embodiments, the micro-orchestrator logic unit 1220 may transmit the analysis of the requested job to the orchestrator server 1204 such that the orchestrator server 1204 may determine how to divide the job into multiple tasks to be executed on one or more accelerator devices 1222 on multiple accelerator sleds 1202. In such embodiments, each micro-orchestrator logic unit 1220 of one or more accelerator sleds 1202 may receive assigned tasks from the orchestrator server 1204 to schedule the assigned tasks to available accelerator device(s) 1222 based on the job analysis and the configuration of the respective accelerator sled 1202.

In some embodiments, the orchestrator server 1204 may determine that only a portion of the job received from the compute sled 1206 can be accelerated based on the job analysis and the configuration of the respective accelerator sled 1202. In such embodiments, the orchestrator server 1204 may inform the requesting compute sled 1206 that the requested job cannot be accelerated as a whole and/or only a portion of the job can be accelerated. The orchestrator server 1204 may subsequently receive instructions from the compute sled 1206 indicative of how to execute the job. For example, the compute sled 1206 may return a simplified job that can be accelerated as a whole or request to perform the portion of the job that can be accelerated on one or more accelerator sleds 1202.

As discussed above, an accelerator sled 1202 may not include an inter-accelerator communication interface (e.g., a HSSI) between the accelerator devices 1222 (e.g., the accelerator sled 1202*b*). In such embodiments, an accelerator device 1222 on an accelerator sled 1202 may communicate with another accelerator device 1222 on the same accelerator sled 1202 via the shared virtual memory 1282 of the memory sled 1208 to execute parallel tasks that share data. Additionally or alternatively, one or more accelerator devices 1222 on an accelerator sled 1202 may communicate with one or more accelerator devices 1222 on a different accelerator sled 1202 via the shared virtual memory 1282 to execute parallel tasks that share data. As such, it should be appreciated that determining whether the tasks of the requested job may be executed in parallel on multiple kernels 1224 is based at least in part on the configuration of each accelerator device 1222.

The main memory 1314 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 1314 may be integrated into the CPU 1312. In operation, the memory 1314 may store various data and software used during operation of the accelerator sled 1202 such as operating systems, applications, programs, libraries, and drivers.

The compute engine 1310 is communicatively coupled to other components of the accelerator sled 1202 via the I/O subsystem 1320, which may be embodied as circuitry and/or components to facilitate input/output operations with the CPU 1312, the micro-orchestrator logic unit 1220, the memory 1314, and other components of the accelerator sled 1202. For example, the I/O subsystem 1320 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1320 may form a portion of a system-on-a-chip (SoC) and be incorporated, along with one or more of the CPU 1312, the micro-orchestrator logic unit 1220, the memory 1314, and other components of the accelerator sled 1202, on a single integrated circuit chip.

The communication circuitry 1330 may be embodied as any communication circuit, device, or collection thereof, capable of enabling communications between the accelerator sled 1202 and another compute device (e.g., the orchestrator server 1204, a compute sled 1206, a memory sled 1208, and/or the client device 1210 over the network 1212). The communication circuitry 1330 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1330 may include a network interface controller (NIC) 1332, which may also be referred to as a host fabric interface (HFI). The NIC 1332 may be embodied as one or more add-in-boards, daughtercards, network interface cards, controller chips, chipsets, or other devices that may be used by the accelerator sled 1202 to connect with another compute device (e.g., the orchestrator server 1204, a compute sled 1206, a memory sled 1208, and/or the client device 1210). In some embodiments, the NIC 1332 may be embodied as part of a system-on-a-chip (SoC) that includes one or more processors, or included on a multichip package that also contains one or more processors. In some embodiments, the NIC 1332 may include a local processor (not shown) and/or a local memory (not shown) that are both local to the NIC 1332. In such embodiments, the local processor of the NIC 1332 may be capable of performing one or more of the functions of the CPU 1312 described herein. Additionally or alternatively, in such embodiments, the local memory of the NIC 1332 may be integrated into one or more components of the accelerator sled 1202 at the board level, socket level, chip level, and/or other levels. Additionally or alternatively, the accelerator sled 1202 may include one or more peripheral devices. Such peripheral devices may include any type of peripheral device commonly found in a compute device such as a display, speakers, a mouse, a keyboard, and/or other input/output devices, interface devices, and/or other peripheral devices.

The accelerator subsystem 1340 may be embodied as any type of devices configured for reducing an amount of time required to process a requested job received directly or indirectly from a compute sled 1206 executing a workload (e.g., an application). To do so, in the illustrative embodiment, the accelerator subsystem 1340 includes the accelerator devices 1222, each of which may be embodied as any type of device configured for executing scheduled tasks of the requested job to be accelerated. Each accelerator device 1222 may be embodied as a single device such as an integrated circuit, an embedded system, a FPGA, a SOC, an ASIC, reconfigurable hardware or hardware circuitry, or other specialized hardware to facilitate performance of the functions described herein. In some embodiments, the accelerator subsystem 1340 may include a high-speed serial interface (HSSI). As discussed above, the HSSI 1340, in the illustrative embodiment, is an inter-accelerator communication interface (e.g., the inter-accelerator communication interface 1226) that facilitates communication between accelerator devices 1222 on the same accelerator sled 1202 (e.g., the accelerator sled 1202a).

Figure 14:
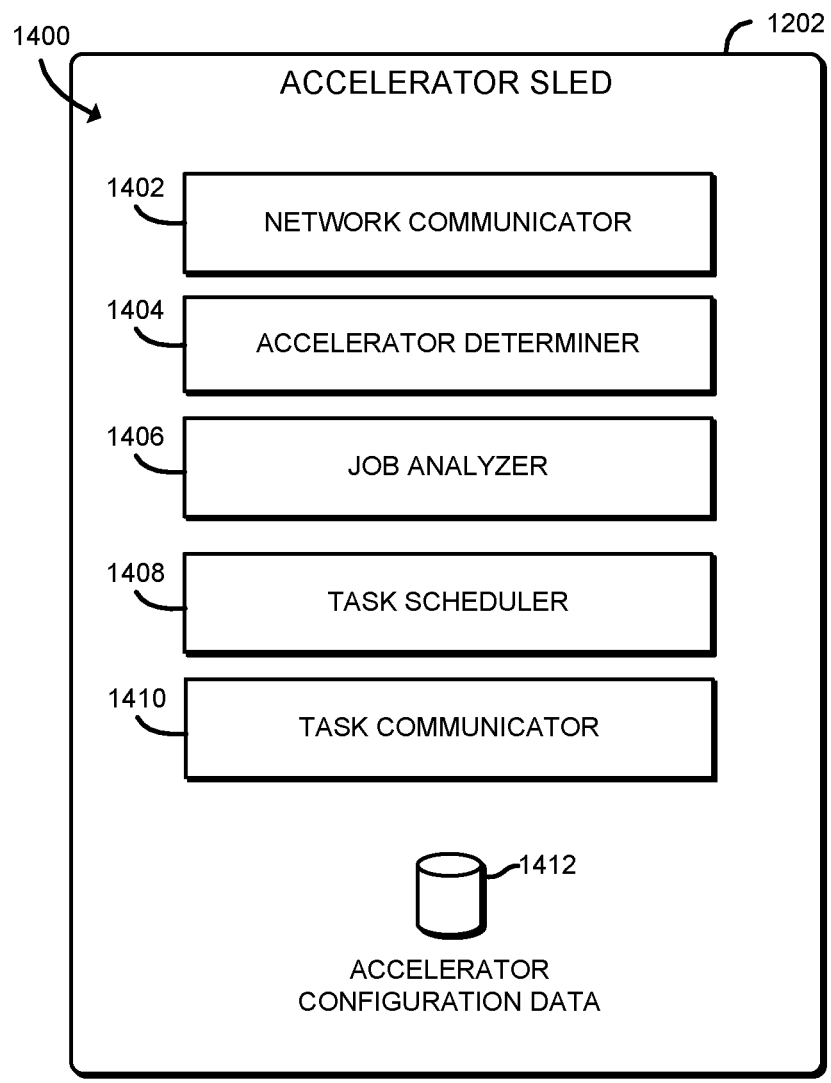
FIG. 14 is a simplified block diagram of at least one embodiment of the accelerator sled of the system of FIGS. 12 and 13.

Referring now to FIG. 14, in the illustrative embodiment, the accelerator sled 1202 may establish an environment 1400 during operation. The illustrative environment 1400 includes a network communicator 1402, an accelerator determiner 1404, a job analyzer 1406, a task scheduler 1408, and a task communicator 1410. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1402, accelerator determiner circuitry 1404, job analyzer circuitry 1406, task scheduler circuitry 1408, task communicator circuitry 1410, etc.). It should be appreciated that, in such embodiments, one or more of the network communicator circuitry 1402, the accelerator determiner circuitry 1404, the job analyzer circuitry 1406, the task scheduler circuitry 1408, or the task communicator circuitry 1410 may form a portion of one or more of the CPU 1312, the micro-orchestrator logic unit 1220, the memory 1314, the I/O subsystem 1320, and/or other components of the accelerator sled 1202.

In the illustrative environment 1400, the network communicator 1402, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the accelerator sled 1202, respectively. To do so, the network communicator 1402 is configured to receive and process data from one system or computing device (e.g., the orchestrator server 1204, a compute sled 1206, a memory sled 1208, etc.) and to prepare and send data to a system or computing device (e.g., the orchestrator server 1204, a compute sled 1230, a memory sled 1208, etc.). Accordingly, in some embodiments, at least a portion of the functionality of the network communicator 1402 may be performed by the communication circuitry 1308, and, in the illustrative embodiment, by the NIC (e.g., an HFI) 1332.

The accelerator determiner 1404, which may be embodied as hardware, firmware, software, virtualized hardware, emulated architecture, and/or a combination thereof as discussed above, is configured to determine a configuration of each accelerator device 1222 on the respective accelerator sled 1202. To do so, the accelerator determiner 1404 is configured to determine the features of hardware components of each accelerator device 1222. For example, the accelerator determiner 1404 determines a configuration of each accelerator device 1222, including a number of kernels 1224 of each accelerator device 1222, whether the respective accelerator device 1222 is communicatively coupled to an inter-accelerator communication interface, such as a HSSI 1226, and/or whether the respective accelerator device 1222 is capable of utilizing the shared virtual memory 1282 (e.g., is capable of mapping memory addresses of the shared virtual memory 1282 as local memory addresses). The accelerator determiner 1404 is further configured to generate accelerator configuration data for each accelerator device 1222 (e.g., any data indicative of the features of each accelerator device 1222), and the accelerator configuration data is stored in an accelerator configuration database 1412. As discussed in detail below, the accelerator configuration data is used to determine how to divide the requested job to be accelerated into multiple tasks that may be executed in parallel on one or more accelerator devices 1222.

The job analyzer 1406, which may be embodied as hardware, firmware, software, virtualized hardware, emulated architecture, and/or a combination thereof as discussed above, is configured to analyze a requested job to be accelerated. Specifically, the job analyzer 1406 is configured to analyze the code of the requested job to determine how to divide functions in the code of the requested job into multiple tasks that may be executed on one or more accelerator devices 1222. Specifically, the job analyzer 1406 analyzes the requested job to determine whether the tasks may be concurrently executed on one or more accelerator devices 1222. It should be appreciated that the job analyzer 1406 may determine that the requested job includes tasks that are capable of being executed in parallel (e.g., either by sharing a data set or because they do not use the output of the other concurrently executed tasks as input) and tasks that are to be executed in sequence (e.g., because they use the final output of another task as an input data set).

For example, the job analyzer 1406 may determine that two tasks (e.g., task A and task B) may share the data associated with a requested job (i.e., read from or write to the different parts of the same data set at the same time, such as encoding or decoding different sections of an image or other data set). In such case, the job analyzer 1406 determines that the two tasks should be executed in parallel in order to reduce an amount of time required to complete the requested job. The job analyzer 1406 may also determine that multiple tasks do not share a data set and the output of one of the tasks does not depend on the output of the other task or vice versa. As such, the job analyzer 1406 may determine that these tasks may also be executed in parallel because they are independent of each other in terms of the data sets that they operate on. On the other hand, if the job analyzer 1406 determines that the output of the one task (e.g., task B) depends on the output of the first task (e.g., uses the final output of task A as an input), the job analyzer 1406 determines that the order of operations of those tasks is important to achieve a correct output; therefore, the task A should be executed prior to the execution of task B. As discussed below, the job analysis is used to schedule the tasks across one or more accelerator devices 1222 for efficient execution of the requested job.

The task scheduler 1408, which may be embodied as hardware, firmware, software, virtualized hardware, emulated architecture, and/or a combination thereof as discussed above, is configured to schedule the tasks of the requested job across one or more accelerator devices 1222. The task scheduler 1408 is configured to maximize the parallelization of the tasks to minimize the execution time of the tasks based on the job analysis performed by the job analyzer 1406. In some cases, if the tasks of the requested job share a data set, the task scheduler 1408 is configured to schedule those tasks to be executed in parallel on one or more accelerator devices 1222 in order to reduce an amount of time required to process the requested job. For example, if a requested job includes compression of an image stored in a shared virtual memory 1282, the task scheduler 1408 divides the job into multiple tasks and schedules the tasks across one or more accelerator devices 1222 in parallel. The one or more accelerator devices 1222 then concurrently execute the compression tasks on different parts of the same image data stored in the shared virtual memory 1282. It should be appreciated that outputs of each task executed on the accelerator device 1222 are combined to obtain a correct output of the job. In some embodiments, the task scheduler 1408 may further identify the communication mechanism (e.g., an inter-accelerator communication interface 1226, shared virtual memory 1282, etc.) based on the accelerator configuration data 1412 for the present accelerator sled 1202. It should be appreciated that if the parallel tasks that share the data are scheduled on the accelerator devices 1222 on the same accelerator sled 1202, the accelerator devices 1222 may establish communication between the accelerator devices 1222 via the HSSI 1226, if the accelerator sled 1202 includes the HSSI 1226, or via the shared virtual memory 1282 to share data and produce a correct output.

If, however, the tasks are independent of one another and do not share data, the task scheduler 1408 may schedule those independent tasks on one or more accelerator devices 1222 on one or more accelerator sleds 1202 to be executed in parallel or at different times. Alternatively or additionally, some of the tasks of the requested job may not be executed in parallel if one or more tasks depend on one or more outputs of one or more previous tasks. In that case, the task scheduler 1408 schedules the dependent tasks to be sequentially executed in a correct order to achieve a correct output. For example, if the received job includes encrypted and compressed data, an output of a decompression task depends on the output of the decompression task (i.e., decompressed encrypted data); therefore, the decryption task should be executed prior to the execution of the decompression task to obtain the correct output. In such case, the task scheduler 1408 schedules the tasks on one or more accelerator devices 1222 such that the decryption task is first executed, followed by the execution of the decompression task. As such, the task scheduler 1408 is configured to examine the characteristics of the tasks determined by the job analyzer 1406, to efficiently schedule the tasks on one or more accelerator devices 1222. By analyzing the data dependencies of the tasks identified by the job analyzer 1406, the task scheduler 1408 is configured to schedule the tasks to maximize the parallelization of the tasks and to minimize the execution time of the job.

The task communicator 1410, which may be embodied as hardware, firmware, software, virtualized hardware, emulated architecture, and/or a combination thereof as discussed above, is configured to facilitate inbound and outbound communications to and from accelerator devices 1222 of the accelerator sled 1202 and/or with accelerator devices 1222 of other accelerator sleds 1202 in the system 1200. Between the accelerator devices 1222 on the same accelerator sled 1202, at least a portion of the functionality of the task communicator 1410 may be performed by the accelerator subsystem 1340, and, in the illustrative embodiment, by the HSSI 1342. Similarly, the task communicator 1410 may access data in the shared virtual memory 1282 to enable a task executed on the present accelerator sled 1202 to access a data set that is also being accessed by a concurrently executing task that utilizes the data set in the shared memory 1282 (e.g., on the same accelerator sled 1202 or on a different accelerator sled 1202). Similarly, the task communicator 1410 may receive output from one task as input for another task and/or provide the output of a task for use as input for by another task.

Figure 15:
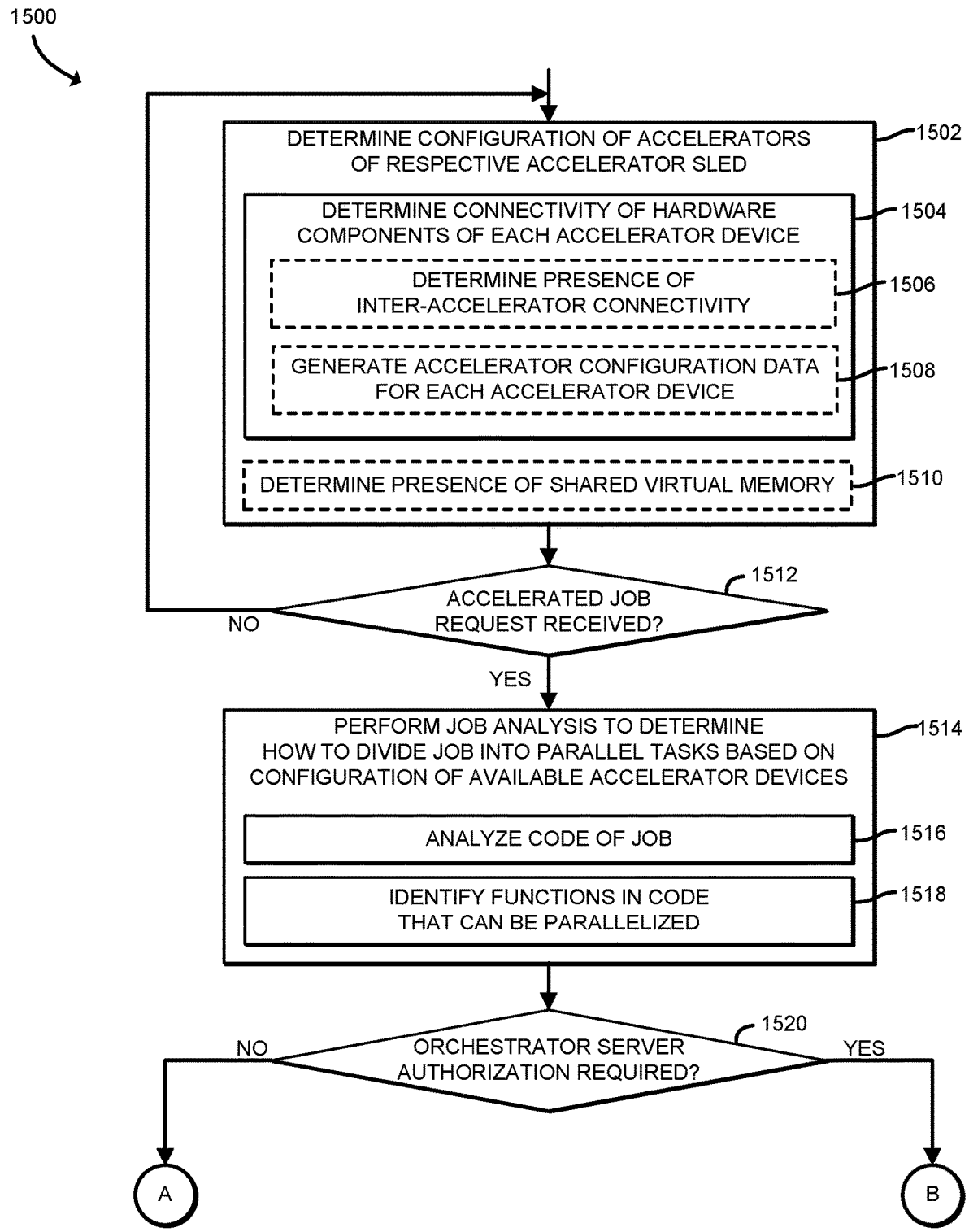
FIGS. 15-17 are a simplified flow diagram of at least one embodiment of a method for dividing work across one or more accelerator devices that may be performed by the accelerator sled of FIGS. 12-14.
Figure 16:
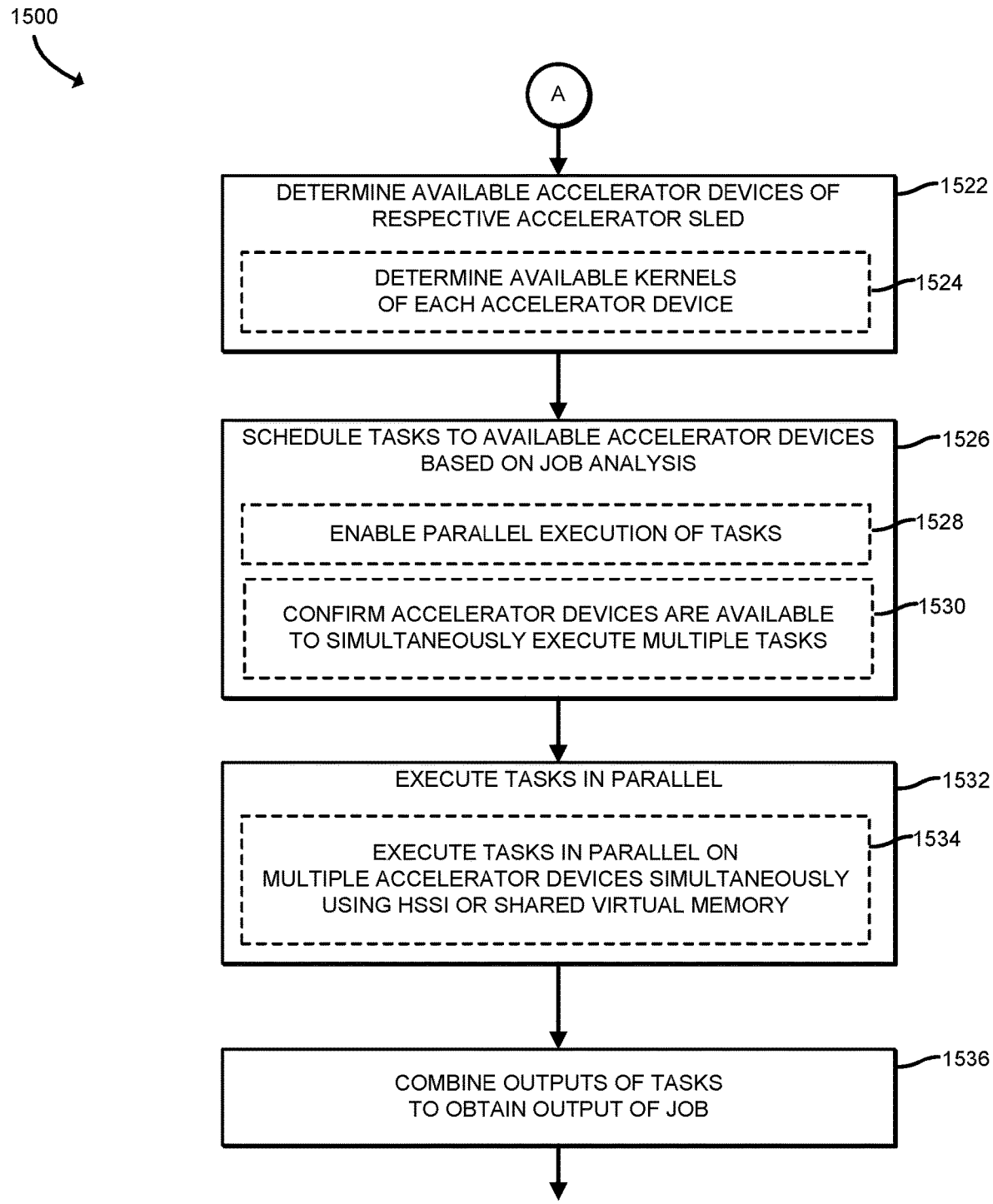
Figure 17:
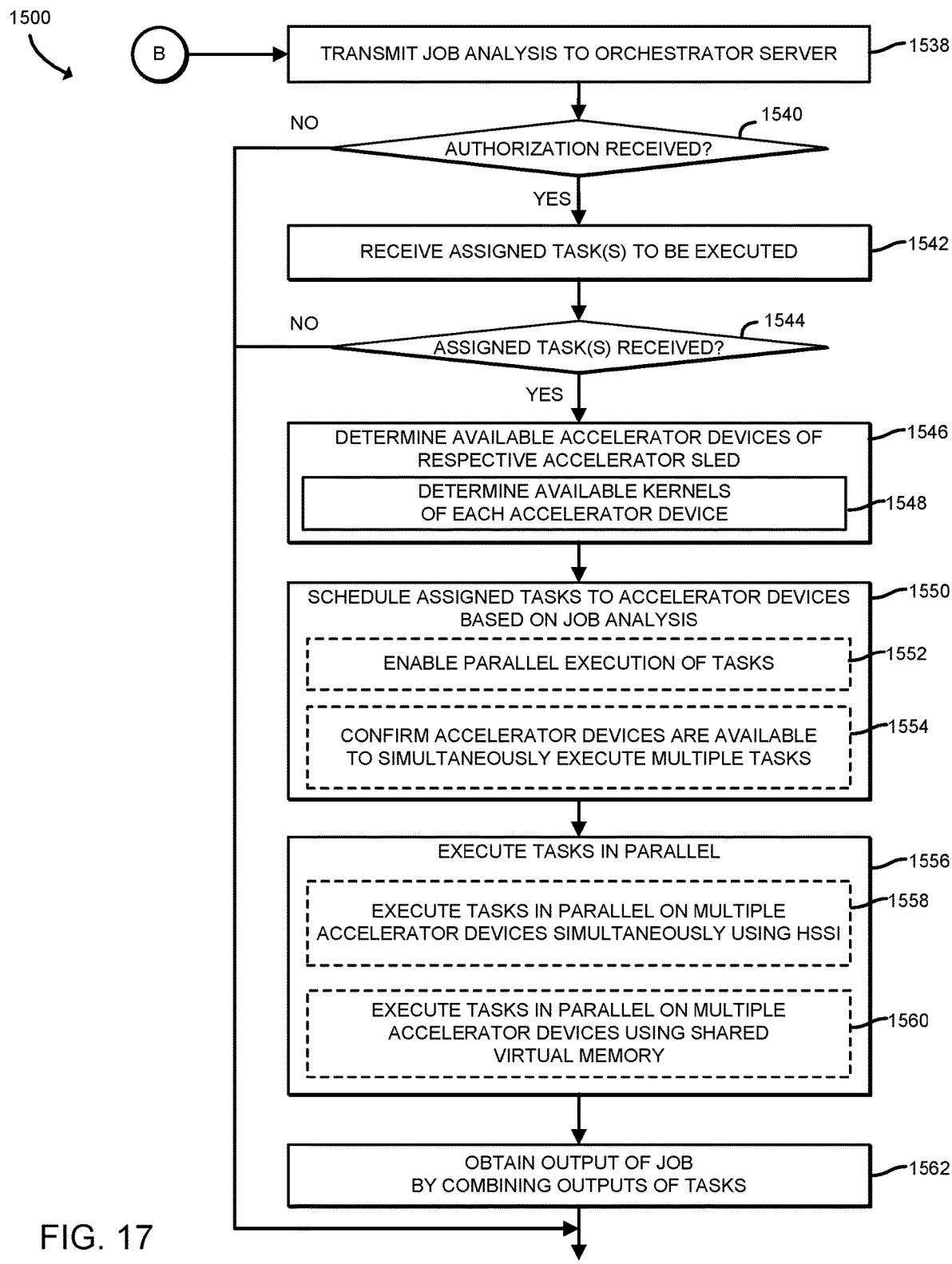

Referring now to FIGS. 15-17, in use, the accelerator sled 1202 may execute a method 1500 for dividing a requested job to be accelerated into multiple tasks to be executed on one or more accelerator devices 1222. The method 1500 begins with block 1502 in which the accelerator sled 1202 determines a configuration of each accelerator device 1222 of the respective accelerator sled 1202. To do so, in block 1504, the accelerator sled 1202 may determine a connectivity of hardware components of each accelerator device 1222. For example, the accelerator sled 1202 determines a number of kernels 1224 and connectivity between the kernels 1224 of each accelerator device 1222. In some embodiments, in block 1506, the accelerator sled 1202 may determine whether at least one of the accelerator devices 1222 of the accelerator device 1222 is communicatively coupled to the other accelerator device(s) 1222 of the accelerator sled 1202 via an inter-accelerator communication interface, such as an HSSI 1226. Additionally, the accelerator sled 1202 may generate accelerator configuration data for each accelerator device 1222 and may store in the accelerator configuration database 1412, as indicated in block 1508. In block 1510, the accelerator sled 1202 may further determine whether the accelerator sled 1202 is communicatively coupled to the shared virtual memory 1282.

In block 1512, the accelerator sled 1202 determines whether an accelerated job request has been received. The accelerated job request includes a job to be accelerated. In some embodiments, the accelerated job request may be directly received from the compute sled 1206 executing an application. In other embodiments, the accelerator sled 1202 may receive an accelerated job request indirectly from the compute sled 1206 via the orchestrator server 1204. If the accelerator sled 1202 determines that an accelerated job request has not been received, the method 1500 loops back to block 1502 to continue determining the configuration of available accelerator devices 1222 and monitoring for an accelerated job request. If, however, the accelerator sled 1202 determines that an accelerated job request has been received, the method 1500 advances to block 1514.

In block 1514, the accelerator sled 1202 performs a job analysis on the requested job to be accelerated to determine how to divide the job into parallel tasks based on the configuration of the available accelerator devices 1222. To do so, in block 1516, the accelerator sled 1202 analyzes a code of the job and identifies functions in the code that can be parallelized in block 1518. The accelerator sled 1202 may determine whether an order and/or a timing of executions of certain tasks are material to obtain a correct output of the job. For example, the accelerator sled 1202 determines that the tasks may be executed in parallel if the tasks share the same data or if the tasks do not depend on any outputs of previous tasks as inputs. Additionally, the accelerator sled 1202 also identifies the tasks that cannot be executed in parallel. For example, the accelerator sled 1202 may identify the tasks that rely on outputs of previous tasks to be sequentially executed in a correct order to achieve a correct output.

In block 1520, the accelerator sled 1202 determines whether an orchestrator server authorization is required. In other words, the accelerator sled 1202 determines whether an authorization from the orchestrator server 1204 is required to schedule the tasks to one or more accelerator devices 1222 on the accelerator sled 1202. This is because, in some embodiments, the orchestrator server 1204 may determine, based on the job analysis received from one or more accelerator sleds 1202, how the requested job should be divided into multiple tasks that are executed on different accelerator devices 1222 on multiple accelerator sleds 1202 as described in detail below. In some embodiments, the accelerator sled 1202 may query the orchestrator server 1204 whether an authorization is required. Alternatively, in other embodiments, the accelerator sled 1202 may determine whether an orchestrator server authorization is required based on the configuration of the accelerator sled 1202 and/or the job analysis of the requested job.

If the accelerator sled 1202 determines that the orchestrator server authorization is not required, the method 1500 advances to block 1522 shown in FIG. 16. In block 1522, the accelerator sled 1202 determines one or more accelerator devices 1222 that are available on the accelerator sled 1202 to execute one or more tasks. To do so, in some embodiments, the accelerator sled 1202 determines available kernels 1224 of each accelerator device 1222 in block 1524.

Subsequently, in block 1526, the accelerator sled 1202 schedules the tasks to one or more available accelerator devices 1222 based on the job analysis. As described above, the accelerator sled 1202 has analyzed the requested job to be accelerated to identify the tasks that can be executed in parallel to operate on the same data set, the tasks that may or may not be executed in parallel (e.g., use independent data sets), and the tasks that are to be executed in sequence because of their dependency on the final output of other tasks. Based on the job analysis, the accelerator sled 1202 is configured to schedule the tasks on one or more accelerator devices 1222 to maximize the parallelization of the tasks to reduce a total execution time of the job. To do so, in some embodiments, the accelerator sled 1202 may enable a parallel execution of tasks in block 1528. In such embodiments, the parallel execution of tasks on one or more accelerator devices 1222 on the accelerator sled 1202 is achieved by the inter-accelerator communication interface 1226 between the one or more accelerator devices 1222 on the accelerator sled 1202. However, it should be appreciated that the parallel execution of tasks may be achieved by virtualization of the shared data using the shared virtual memory 1282. Additionally, in some embodiments in block 1530, the accelerator sled 1202 may confirm the availability of one or more accelerator devices 1222 to execute one or more tasks (e.g., that the accelerator device 1222 is not presently experiencing a load above a predefined threshold amount, that one or more kernels of the accelerator device 1222 are not presently executing a task, etc.).

In block 1532, the accelerator sled 1202 may execute multiple scheduled tasks in parallel. For example, in some embodiments in block 1534, if the accelerator devices 1222 of the accelerator sled 1202 are configured to execute tasks that share the same data, one of the accelerator devices 1222 of the accelerator sled 1202 may communicate with the other accelerator device 1222 of the same accelerator sled 1202 using the inter-accelerator communication interface 1226 (e.g., the HSSI) or the shared virtual memory 1282, based on the configuration of the accelerator sled 1202, to share the data. Subsequently, in block 1536, the accelerator sled 1202 combines the outputs of the tasks to obtain an output of the job in block 1538. It should be appreciated that if the tasks are scheduled on the accelerator devices 1222 on the accelerator sled 1202 that has the HSSI 1226 (e.g., the accelerator sled 1202a), the accelerator devices 1222 may communicate with one another via the HSSI 1226 to combine the outputs of the tasks to obtain the output of the job. If, however, the tasks are scheduled on the accelerator devices 1222 on the same accelerator sled 1202 (e.g., the accelerator sled 1202b) that does not have a HSSI 1226, the accelerator devices 1222 may communicate with one another via the shared virtual memory 1282 to combine the outputs of the tasks to obtain the output of the job.

Referring back to block 1520 in FIG. 15, if the accelerator sled 1202 determines that the orchestrator server authorization is required, the method 1500 advances to block 1538 shown in FIG. 17, in which the accelerator sled 1202 transmits the job analysis performed by the accelerator sled 1202 to the orchestrator server 1204. In other words, the orchestrator server 1204 receives job analyses from multiple accelerator sleds 1202 and determines how to efficiently divide the requested job into multiple tasks to be executed on multiple accelerator devices 1222 on the multiple accelerator sleds 1202 using a process similar to that described above with reference to blocks 1522, 1526 of FIG. 16.

Subsequently, in block 1540, the accelerator sled 1202 determines whether an authorization from the orchestrator server 1204 has been received. If the authorization is not received during a predefined period of time, the accelerator sled 1202 determines that the accelerator devices 1222 of the accelerator sled 1202 have not been selected to execute the tasks by the orchestrator server 1204, and the method 1500 advances to the end.

If, however, the accelerator sled 1202 determines that the authorization has been received, the method 1500 advances to block 1542. In block 1542, the accelerator sled 1202 receives one or more assigned tasks to be executed on the accelerator sled 1202. If the accelerator sled 1202 determines that the assigned task(s) is not received during a predefined period of time in block 1544, the method 1500 advances to the end. If, however, the accelerator sled 1202 determines that the assigned task(s) has been received, the method 1500 advances to block 1546.

In block 1546, the accelerator sled 1202 determines one or more available accelerator devices 1222 of the respective accelerator sled 1202. Specifically, the accelerator sled 1202 determines available kernels 1224 of each accelerator device 1222 in block 1548 to determine how to schedule the assigned tasks across the multiple kernels 1224 of the accelerator devices 1222 on multiple accelerator sleds 1202.

Subsequently, in block 1550, the accelerator sled 1202 schedules the assigned tasks to the accelerator devices 1222 based on the job analysis to maximize the parallelization of the tasks to reduce a total execution time of the job. As discussed above, the job analysis indicates whether the tasks may be executed in parallel or require to be executed in a particular sequence. To do so, in block 1552, the accelerator sled 1202 may enable parallel execution of independent tasks. In such embodiments, the parallel execution of tasks on multiple accelerator devices 1222 on different accelerator sleds 1202 is achieved by sharing a data set using the shared virtual memory 1282 (e.g., mapping memory addresses of the shared virtual memory 1282 as local memory for each accelerator device 1222). It should be appreciated that the inter-accelerator communication interface 1226 is limited to providing the communication between the accelerator devices 1222 on the same accelerator sled 1202. In some embodiments, in block 1554, the accelerator sled 1202 may confirm that the accelerator devices 1222 on the respective accelerator sled 1202 are available to concurrently execute the multiple tasks at the same time.

Subsequently, in block 1556, the assigned tasks are executed in parallel on multiple accelerator devices 1222, potentially on different accelerator sleds 1202. For example, if the assigned tasks share the same data, the multiple accelerator devices 1222 on different accelerator sleds 1202 may concurrently execute the assigned tasks using the shared virtual memory 1282 to read from and/or write to the shared data present in the shared virtual memory 1282. In some embodiments, some of the assigned tasks may be assigned to the accelerator devices 1222 on a single accelerator sled 1202 that may or may not have an inter-accelerator communication interface 1226 (e.g., HSSI). If the tasks are assigned to the accelerator devices 1222 of the accelerator sled 1202 that has the HSSI 1226, in block 1558, the accelerator devices 1222 on that accelerator sled 1202 may concurrently execute the assigned tasks using the HSSI 1226 to share the data. If, however, the tasks are assigned to an accelerator sled 1202 that does not have a HSSI 1226 (e.g., the accelerator sled 1202*b*), the accelerator devices 1222 may concurrently execute the assigned tasks using the shared virtual memory 1282 to read from and/or write to the shared data stored in the shared virtual memory 1282, as indicated in block 1560. Subsequently, in block 1562, the accelerator sled 1202 combines the outputs of the assigned tasks of the corresponding accelerator device 1222 to obtain an output of the job.

EXAMPLES

Illustrative examples of the technologies disclosed herein are provided below. An embodiment of the technologies may include any one or more, and any combination of, the examples described below.

Example 1 includes a compute device comprising one or more accelerator devices; and a compute engine to determine a configuration of each accelerator device of the compute device, wherein the configuration is indicative of parallel execution features present in each accelerator device; receive, from a requester device remote from the compute device, a job to be accelerated; divide the job into multiple tasks for a parallelization of the multiple tasks among the one or more accelerator devices as a function of a job analysis of the job and the configuration of each accelerator device; schedule the tasks to the one or more accelerator devices based on the job analysis; execute the tasks on the one or more accelerator devices for the parallelization of the multiple tasks; and combine task outputs from the accelerator devices that executed the tasks to obtain an output of the job.

Example 2 includes the subject matter of Example 1, and wherein the compute engine includes a micro-orchestrator logic unit.

Example 3 includes the subject matter of any of Examples 1 and 2, and wherein to determine the configuration of each accelerator device comprises to determine, by the micro-orchestrator logic unit of the compute device, the configuration of each accelerator device.

Example 4 includes the subject matter of any of Examples 1-3, and wherein the compute engine is further to determine an availability of one or more of the accelerator devices and each of the accelerator devices is not a general purpose processor.

Example 5 includes the subject matter of any of Examples 1-4, and wherein to determine the availability of one or more of the accelerator devices comprises to determine one or more available kernels of each accelerator device.

Example 6 includes the subject matter of any of Examples 1-5, and wherein to schedule the tasks to the one or more accelerator devices comprises to schedule parallel execution of the tasks.

Example 7 includes the subject matter of any of Examples 1-6, and wherein to schedule the tasks to the one or more accelerator devices comprises to confirm that the one or more accelerator devices are available to simultaneously execute multiple tasks that share data.

Example 8 includes the subject matter of any of Examples 1-7, and wherein to execute the tasks comprises to concurrently execute two or more of the tasks on two or more of the accelerator devices of the compute device with a high speed serial interface (HSSI).

Example 9 includes the subject matter of any of Examples 1-8, and wherein the compute engine is further to determine whether an authorization is required from an orchestrator server to execute the tasks on the compute device; transmit, in response to a determination that the authorization is required, the job analysis to the orchestrator server; receive an authorization from the orchestrator server; and receive the tasks to be accelerated.

Example 10 includes the subject matter of any of Examples 1-9, and wherein the compute device is a first compute device, and wherein to execute the tasks comprises to determine one or more accelerator devices of a second compute device to concurrently execute the tasks that share data; and execute one or more of the tasks on the one or more accelerator devices of the first compute device as one or more other tasks of the job are concurrently executed with one or more accelerator devices of the second compute device using a shared virtual memory.

Example 11 includes the subject matter of any of Examples 1-10, and wherein to determine the one or more accelerator devices of the second compute device comprises to receive information regarding one or more accelerator devices of the second compute device from the orchestrator server.

Example 12 includes the subject matter of any of Examples 1-11, and wherein to execute the tasks comprises to execute the tasks simultaneously on the one or more accelerator devices of the compute device with a high speed serial interface (HSSI).

Example 13 includes a method comprising determining, by a compute device, a configuration of each of one or more accelerator devices of the compute device, wherein the configuration is indicative of parallel execution features present in each accelerator device; receiving, from a requester device remote from the compute device and by the compute device, a job to be accelerated; dividing, by the compute device, the job into multiple tasks for a parallelization of the multiple tasks among the one or more accelerator devices as a function of a job analysis of the job and the configuration of each accelerator device; scheduling, by the compute device, the tasks to the one or more accelerator devices based on the job analysis; executing, by the compute device, the tasks on the one or more accelerator devices for the parallelization of the multiple tasks; and combining, by the compute device, task outputs from the accelerator devices that executed the tasks to obtain an output of the job.

Example 14 includes the subject matter of Example 13, and wherein dividing the job as a function of the job analysis and the configuration of each accelerator device comprises performing, with a micro-orchestrator unit of the compute device, the job analysis.

Example 15 includes the subject matter of any of Examples 13 and 14, and wherein determining the configuration of each accelerator device comprises determining, by a micro-orchestrator logic unit of the compute device, the configuration of each accelerator device.

Example 16 includes the subject matter of any of Examples 13-15, and further including determining, by the compute device, an availability of one or more of the accelerator devices, and each of the accelerator devices is not a general purpose processor.

Example 17 includes the subject matter of any of Examples 13-16, and wherein determining the availability of one or more of the accelerator devices comprises determining one or more available kernels of each accelerator device.

Example 18 includes the subject matter of any of Examples 13-17, and wherein scheduling the tasks to the one or more accelerator devices comprises scheduling parallel execution of the tasks.

Example 19 includes the subject matter of any of Examples 13-18, and wherein scheduling the tasks to the one or more accelerator devices comprises confirming that the one or more accelerator devices are available to simultaneously execute multiple tasks that share data.

Example 20 includes the subject matter of any of Examples 13-19, and wherein executing the tasks comprises concurrently executing two or more of the tasks on two or more accelerator devices of the compute device with a high speed serial interface (HSSI).

Example 21 includes the subject matter of any of Examples 13-20, and further including determining, by the compute device, whether an authorization is required from an orchestrator server to execute the tasks on the compute device; transmitting, by the compute device and in response to a determination that the authorization is required, the job analysis to the orchestrator server; receiving, by the compute device, an authorization from the orchestrator server; and receiving, by the compute device, the tasks to be accelerated.

Example 22 includes the subject matter of any of Examples 13-21, and wherein the compute device is a first compute device, and wherein executing the tasks comprises determining, by the first compute device, one or more accelerator devices of a second compute device that is remote to the first compute device to concurrently execute the tasks that share data; and executing one or more of the tasks on the one or more accelerator devices of the first compute device as one or more other tasks of the job are concurrently executed with one or more accelerator devices of the second compute device using a shared virtual memory.

Example 23 includes the subject matter of any of Examples 13-22, and wherein determining the one or more accelerator devices of the second compute device comprises receiving information regarding one or more accelerator devices of the second compute device from the orchestrator server.

Example 24 includes the subject matter of any of Examples 13-23, and wherein executing the tasks comprises executing the tasks simultaneously on the one or more accelerator devices of the compute device with a high speed serial interface (HSSI).

Example 25 includes one or more machine-readable storage media comprising a plurality of instructions stored thereon that, in response to being executed, cause a compute device to perform the method of any of Examples 13-24.

Example 26 includes a compute device comprising means for performing the method of any of Examples 13-24.

Example 27 includes a compute device comprising one or more accelerator devices; and a micro-orchestrator logic circuitry to determine a configuration of each accelerator device of the compute device, wherein the configuration is indicative of parallel execution features present in each accelerator device; receive, from a requester device remote from the compute device, a job to be accelerated; divide the job into multiple tasks for a parallelization of the multiple tasks among the one or more accelerator devices as a function of a job analysis of the job and the configuration of each accelerator device; schedule the tasks to the one or more accelerator devices based on the job analysis; execute the tasks on the one or more accelerator devices for the parallelization of the multiple tasks; and combine task outputs from the accelerator devices that executed the tasks to obtain an output of the job.

Example 28 includes the subject matter of Example 27, and wherein the micro-orchestrator logic circuitry includes a micro-orchestrator logic unit.

Example 29 includes the subject matter of any of Examples 27 and 28, and wherein to determine the configuration of each accelerator device comprises to determine, by the micro-orchestrator logic unit of the compute device, the configuration of each accelerator device.

Example 30 includes the subject matter of any of Examples 27-29, and wherein the micro-orchestrator logic circuitry is further to determine an availability of one or more of the accelerator devices, and each of the accelerator devices is not a general purpose processor.

Example 31 includes the subject matter of any of Examples 27-30, and wherein to determine the availability of one or more of the accelerator devices comprises to determine one or more available kernels of each accelerator device.

Example 32 includes the subject matter of any of Examples 27-31, and wherein to schedule the tasks to the one or more accelerator devices comprises to schedule parallel execution of the tasks.

Example 33 includes the subject matter of any of Examples 27-32, and wherein to schedule the tasks to the one or more accelerator devices comprises to confirm that the one or more accelerator devices are available to simultaneously execute multiple tasks that share data.

Example 34 includes the subject matter of any of Examples 27-33, and wherein to execute the tasks comprises to concurrently execute two or more of the tasks on two or more of the accelerator devices of the compute device with a high speed serial interface (HSSI).

Example 35 includes the subject matter of any of Examples 27-34, and wherein the micro-orchestrator logic circuitry is further to determine whether an authorization is required from an orchestrator server to execute the tasks on the compute device; transmit, in response to a determination that the authorization is required, the job analysis to the orchestrator server; receive an authorization from the orchestrator server; and receive the tasks to be accelerated.

Example 36 includes the subject matter of any of Examples 27-35, and wherein the compute device is a first compute device, and wherein to execute the tasks comprises to determine one or more accelerator devices of a second compute device that is remote to the first compute device to concurrently execute the tasks that share data; and execute one or more of the tasks on the one or more accelerator devices of the first compute device as one or more other tasks of the job are concurrently executed with one or more accelerator devices of the second compute device using a shared virtual memory.

Example 37 includes the subject matter of any of Examples 27-36, and wherein to determine the one or more accelerator devices of the second compute device comprises to receive information regarding one or more accelerator devices of the second compute device from the orchestrator server.

Example 38 includes the subject matter of any of Examples 27-37, and wherein to execute the tasks comprises to execute the tasks simultaneously on the one or more accelerator devices of the compute device with a high speed serial interface (HSSI).

Example 39 includes a compute device comprising circuitry for determining a configuration of each of one or more accelerator devices of the compute device, wherein the configuration is indicative of parallel execution features present in each accelerator device; circuitry for receiving, from a requester device remote from the compute device, a job to be accelerated; means for dividing the job into multiple tasks for a parallelization of the multiple tasks among the one or more accelerator devices as a function of a job analysis of the job and the configuration of each accelerator device; means for scheduling the tasks to the one or more accelerator devices based on the job analysis; circuitry for executing the tasks on the one or more accelerator devices for the parallelization of the multiple tasks; and means for combining task outputs from the accelerator devices that executed the tasks to obtain an output of the job.

Example 40 includes the subject matter of Example 39, and wherein the means for dividing the job as a function of the job analysis and the configuration of each accelerator device comprises means for performing the job analysis.

Example 41 includes the subject matter of any of Examples 39 and 40, and wherein the circuitry for determining the configuration of each accelerator device comprises circuitry for determining the configuration of each accelerator device.

Example 42 includes the subject matter of any of Examples 39-41, and further including circuitry for determining an availability of one or more of the accelerator devices, and each of the accelerator devices is not a general purpose processor.

Example 43 includes the subject matter of any of Examples 39-42, and wherein the circuitry for determining the availability of one or more of the accelerator devices comprises circuitry for determining one or more available kernels of each accelerator device.

Example 44 includes the subject matter of any of Examples 39-43, and wherein the means for scheduling the tasks to the one or more accelerator devices comprises means for scheduling parallel execution of the tasks.

Example 45 includes the subject matter of any of Examples 39-44, and wherein the means for scheduling the tasks to the one or more accelerator devices comprises means for confirming that the one or more accelerator devices are available to simultaneously execute multiple tasks that share data.

Example 46 includes the subject matter of any of Examples 39-45, and wherein the circuitry for executing the tasks comprises means for concurrently executing two or more of the tasks on two or more accelerator devices of the compute device with a high speed serial interface (HSSI).

Example 47 includes the subject matter of any of Examples 39-46, and further including means for determining whether an authorization is required from an orchestrator server to execute the tasks on the compute device; circuitry for transmitting, in response to a determination that the authorization is required, the job analysis to the orchestrator server; circuitry for receiving an authorization from the orchestrator server; and circuitry for receiving the tasks to be accelerated.

Example 48 includes the subject matter of any of Examples 39-47, and wherein the compute device is a first compute device, and wherein the circuitry for executing the tasks comprises means for determining one or more accelerator devices of a second compute device that is remote to the first compute device to concurrently execute the tasks that share data; and means for executing one or more of the tasks on the one or more accelerator devices of the first compute device as one or more other tasks of the job are concurrently executed with one or more accelerator devices of the second compute device using a shared virtual memory.

Example 49 includes the subject matter of any of Examples 39-48, and wherein the means for determining the one or more accelerator devices of the second compute device comprises means for receiving information regarding one or more accelerator devices of the second compute device from the orchestrator server.

Example 50 includes the subject matter of any of Examples 39-49, and wherein the circuitry for executing the tasks comprises circuitry for executing the tasks simultaneously on the one or more accelerator devices of the compute device with a high speed serial interface (HSSI).

What is claimed is:

1. Network switch circuitry for use in association with a network switch, the network switch to be used in a network, the network switch circuitry to be used in processing associated with network communications that are to be in accordance with multiple different link layer communication protocols, the network communications to be received by and transmitted from the network switch via optical links that are to be coupled between network devices of the network and the network switch, the network switch circuitry comprising:

processor circuitry;

memory storing instructions for being executed by the processor circuitry, the instructions, when executed by the processor circuitry, resulting in the network switch circuitry being configured to enable performance of operations comprising:

switching network communication data associated with (1) at least one of the network communications and (2) at least one other of the network communications;

wherein:

the at least one of the network communications is in accordance with at least one of the multiple different link layer communication protocols; and the at least one other of the network communications is in accordance with at least one other of the multiple different link layer communication protocols.

2. The network switch circuitry of claim 1, wherein:
the network switch circuitry is configurable to generate telemetry information for use in:
cloud service management;
software defined infrastructure management;
resource allocation management; and/or
failure condition detection and prevention.

3. The network switch circuitry of claim 1, wherein:
the multiple different link layer communication protocols comprise an Ethernet protocol and another, different link layer protocol.

4. The network switch circuitry of claim 1, wherein:
the network switch circuitry is configurable for use with a circuit board that is for use in a rack; and
the network switch circuitry is configurable to be coupled to an optical transceiver of the circuit board that is for being coupled to an optical switch infrastructure that comprises one or more of:
an optical fabric;
a leaf switch; and/or
a spine switch.

5. The network switch circuitry of claim 1, wherein:
the network switch circuitry is configurable to permit processor-access, on a dynamic, as needed basis, to at least one physically disaggregated memory resource; and/or
the network switch circuitry is configurable to generate telemetry information to be used in remote automated management of the network.

6. Non-transitory machine-readable memory storing instructions for being executed by processor circuitry of network switch circuitry, the network switch circuitry to be used in association with a network switch, the network switch to be used in a network, the network switch circuitry to be used in processing associated with network communications that are to be in accordance with multiple different link layer communication protocols, the network communications to be received by and transmitted from the network switch via optical links that are to be coupled between network devices of the network and the network switch, the instructions, when executed by the processor circuitry, resulting in the network switch circuitry being configured to enable performance of operations comprising:
switching network communication data associated with (1) at least one of the network communications and (2) at least one other of the network communications;
wherein:
the at least one of the network communications is in accordance with at least one of the multiple different link layer communication protocols; and
the at least one other of the network communications is in accordance with at least one other of the multiple different link layer communication protocols.

7. The non-transitory machine-readable memory of claim 6, wherein:
the network switch circuitry is configurable to generate telemetry information for use in:
cloud service management;
software defined infrastructure management;
resource allocation management; and/or
failure condition detection and prevention.

8. The non-transitory machine-readable memory of claim 6, wherein:
the multiple different link layer communication protocols comprise an Ethernet protocol and another, different link layer protocol.

9. The non-transitory machine-readable memory of claim 6, wherein:
the network switch circuitry is configurable for use with a circuit board that is for use in a rack; and
the network switch circuitry is configurable to be coupled to an optical transceiver of the circuit board that is for being coupled to an optical switch infrastructure that comprises one or more of:
an optical fabric;
a leaf switch; and/or
a spine switch.

10. The non-transitory machine-readable memory of claim 6, wherein:
the network switch circuitry is configurable to permit processor-access, on a dynamic, as needed basis, to at least one physically disaggregated memory resource; and/or
the network switch circuitry is configurable to generate telemetry information to be used in remote automated management of the network.

11. A method implemented using network switch circuitry, the network switch circuitry to be used in association with a network switch, the network switch to be used in a network, the network switch circuitry to be used in processing associated with network communications that are to be in accordance with multiple different link layer communication protocols, the network communications to be received by and transmitted from the network switch via optical links that are to be coupled between network devices of the network and the network switch, the method comprising:
switching network communication data associated with (1) at least one of the network communications and (2) at least one other of the network communications;
wherein:
the at least one of the network communications is in accordance with at least one of the multiple different link layer communication protocols; and
the at least one other of the network communications is in accordance with at least one other of the multiple different link layer communication protocols.

12. The method of claim 11, wherein:
the network switch circuitry is configurable to generate telemetry information for use in:
cloud service management;
software defined infrastructure management;
resource allocation management; and/or
failure condition detection and prevention.

13. The method of claim 11, wherein:
the multiple different link layer communication protocols comprise an Ethernet protocol and another, different link layer protocol.

14. The method of claim 11, wherein:
the network switch circuitry is configurable for use with a circuit board that is for use in a rack; and
the network switch circuitry is configurable to be coupled to an optical transceiver of the circuit board that is for being coupled to an optical switch infrastructure that comprises one or more of:
an optical fabric;
a leaf switch; and/or
a spine switch.

15. The method of claim 11, wherein:

the network switch circuitry is configurable to permit processor-access, on a dynamic, as needed basis, to at least one physically disaggregated memory resource; and/or the network switch circuitry is configurable to generate telemetry information to be used in remote automated management of the network.

16. A data center comprising:

at least one network comprising network devices;

at least one network switch to receive and transmit network communications via optical links that are to be coupled between the network devices and the at least one network switch, the network communications to be in accordance with multiple different link layer communication protocols, the at least one network switch comprising network switch circuitry to switch network communication data associated with (1) at least one of the network communications and (2) at least one other of the network communications;

wherein:

the at least one of the network communications is in accordance with at least one of the multiple different link layer communication protocols; and the at least one other of the network communications is in accordance with at least one other of the multiple different link layer communication protocols.

17. The data center of claim 16, wherein:

the network switch circuitry is configurable to generate telemetry information for use in:

cloud service management;

software defined infrastructure management;

resource allocation management; and/or failure condition detection and prevention.

18. The data center of claim 16, wherein:

the multiple different link layer communication protocols comprise an Ethernet protocol and another, different link layer protocol.

19. The data center of claim 16, wherein:

the network switch circuitry is configurable for use with a circuit board that is for use in a rack; and the network switch circuitry is configurable to be coupled to an optical transceiver of the circuit board that is for being coupled to an optical switch infrastructure that comprises one or more of:

an optical fabric;

a leaf switch; and/or a spine switch.

20. The data center of claim 16, wherein:

the network switch circuitry is configurable to permit processor-access, on a dynamic, as needed basis, to at least one physically disaggregated memory resource; and/or the network switch circuitry is configurable to generate telemetry information to be used in remote automated management of the network.

\* \* \* \* \*